United States Patent
Yasuda et al.

(10) Patent No.: US 8,208,186 B2
(45) Date of Patent: Jun. 26, 2012

(54) POLARIZATION-BASED HOLOGRAPHIC OPTICAL REPRODUCING APPARATUS INCLUDING DC MODULATING ELEMENT

(75) Inventors: Shin Yasuda, Kanagawa (JP); Katsunori Kawano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 579 days.

(21) Appl. No.: 12/415,333

(22) Filed: Mar. 31, 2009

(65) Prior Publication Data

US 2009/0251750 A1   Oct. 8, 2009

(30) Foreign Application Priority Data

Apr. 7, 2008  (JP) ................. 2008-099809
Jan. 8, 2009  (JP) ................. 2009-002444

(51) Int. Cl.
*G03H 1/22* (2006.01)
(52) U.S. Cl. ................. 359/32; 359/21; 359/30
(58) Field of Classification Search .................. None
See application file for complete search history.

(56) References Cited

U.S. PATENT DOCUMENTS

| | | | |
|---|---|---|---|
| 7,262,892 B1 | 8/2007 | Yasuda et al. | |
| 7,826,324 B2 * | 11/2010 | Yasuda et al. | 369/103 |
| 7,952,976 B2 * | 5/2011 | Yasuda et al. | 369/103 |
| 2001/0002895 A1 | 6/2001 | Kawano et al. | |
| 2007/0146846 A1 * | 6/2007 | Yasuda et al. | 359/29 |
| 2007/0147801 A1 | 6/2007 | Yasuda et al. | |
| 2007/0268538 A1 | 11/2007 | Ishioka et al. | |
| 2009/0231650 A1 * | 9/2009 | Minabe et al. | 359/11 |

FOREIGN PATENT DOCUMENTS

| | | |
|---|---|---|
| JP | 2005/284303 A | 10/2005 |
| JP | 2006-259315 A | 9/2006 |
| JP | 2007-179597 A | 7/2007 |
| JP | 2007/310039 A | 11/2007 |
| JP | 2007-335056 A | 12/2007 |
| JP | 2008-15180 A | 1/2008 |

OTHER PUBLICATIONS

Japanese Office Action dated Mar. 29, 2011 for Japanese Patent Application No. 2009-002444 and English-language translation.
Japanese Office Action dated Feb. 2, 2010 for Japanese Patent Application No. 2008-099809 and English-language translation.

\* cited by examiner

*Primary Examiner* — Arnel C Lavarias
(74) *Attorney, Agent, or Firm* — Sughrue Mion, PLLC

(57) ABSTRACT

An optical reproducing method. A diffracted light is generated by irradiating a reference light onto a hologram. A combined light is generated by applying a direct-current component formed by a polarized light having a third polarization component with a first polarization plane having a polarization direction orthogonal to the diffracted light and having the same phase as the diffracted light, and a fourth polarization component with a second polarization plane having an opposite phase to the diffracted light, onto the diffracted light. The combined light is separated into a fifth polarization component including a first polarization component and the third polarization component, and a sixth polarization component including a second polarization component and the fourth polarization component. A first reproduced image is reproduced from the separated fifth polarization component, and a second reproduced image is reproduced from the separated sixth polarization component.

8 Claims, 16 Drawing Sheets

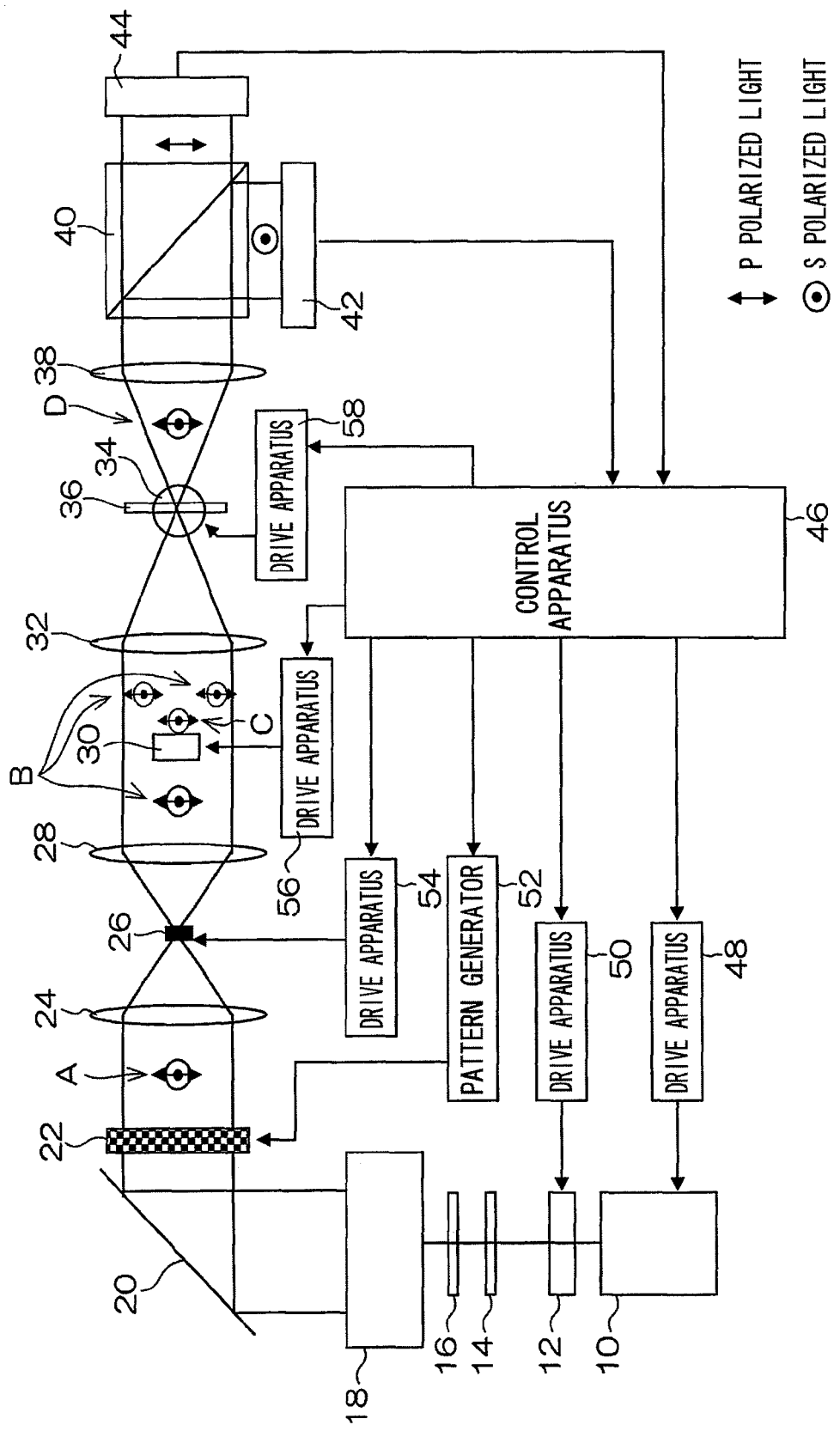

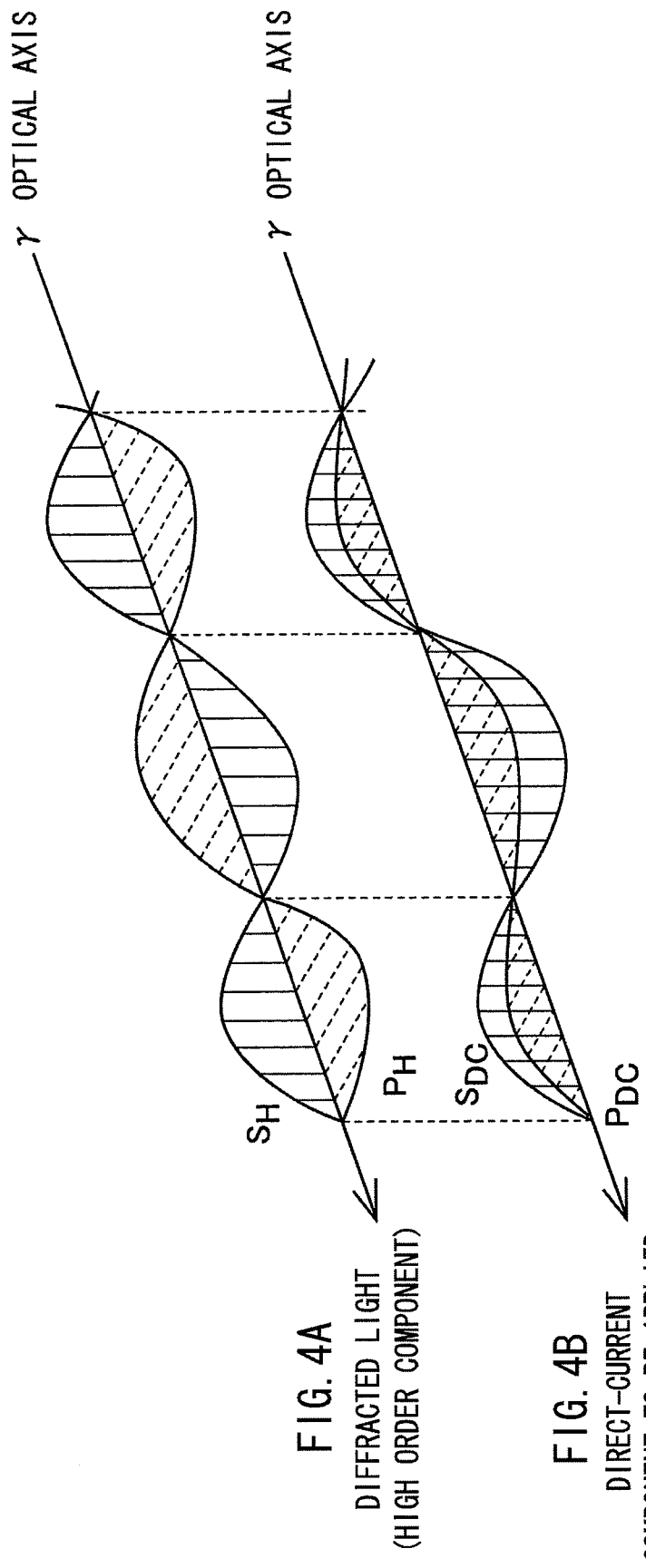
FIG. 4A DIFFRACTED LIGHT (HIGH ORDER COMPONENT)
FIG. 4B DIRECT-CURRENT COMPONENT TO BE APPLIED

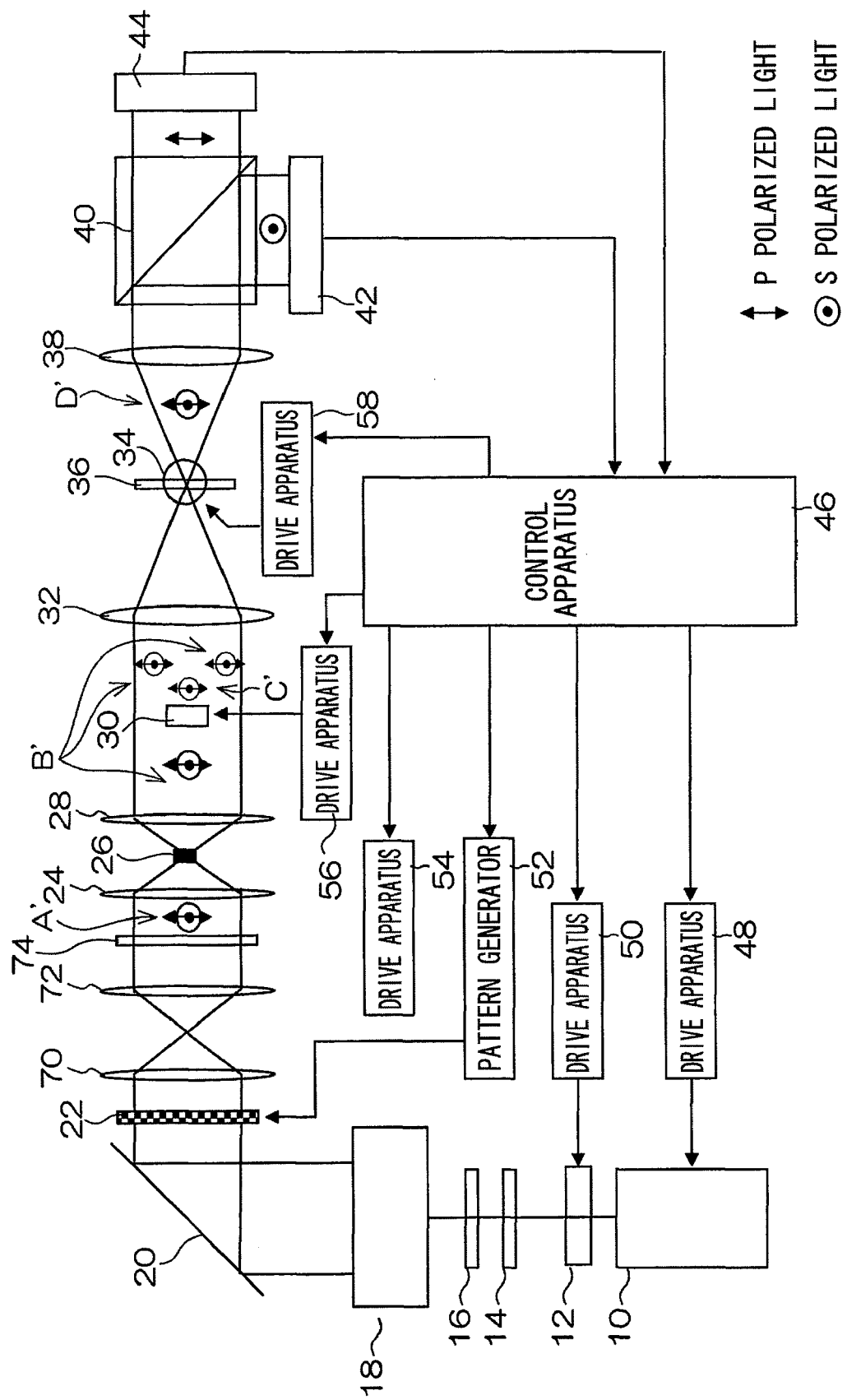

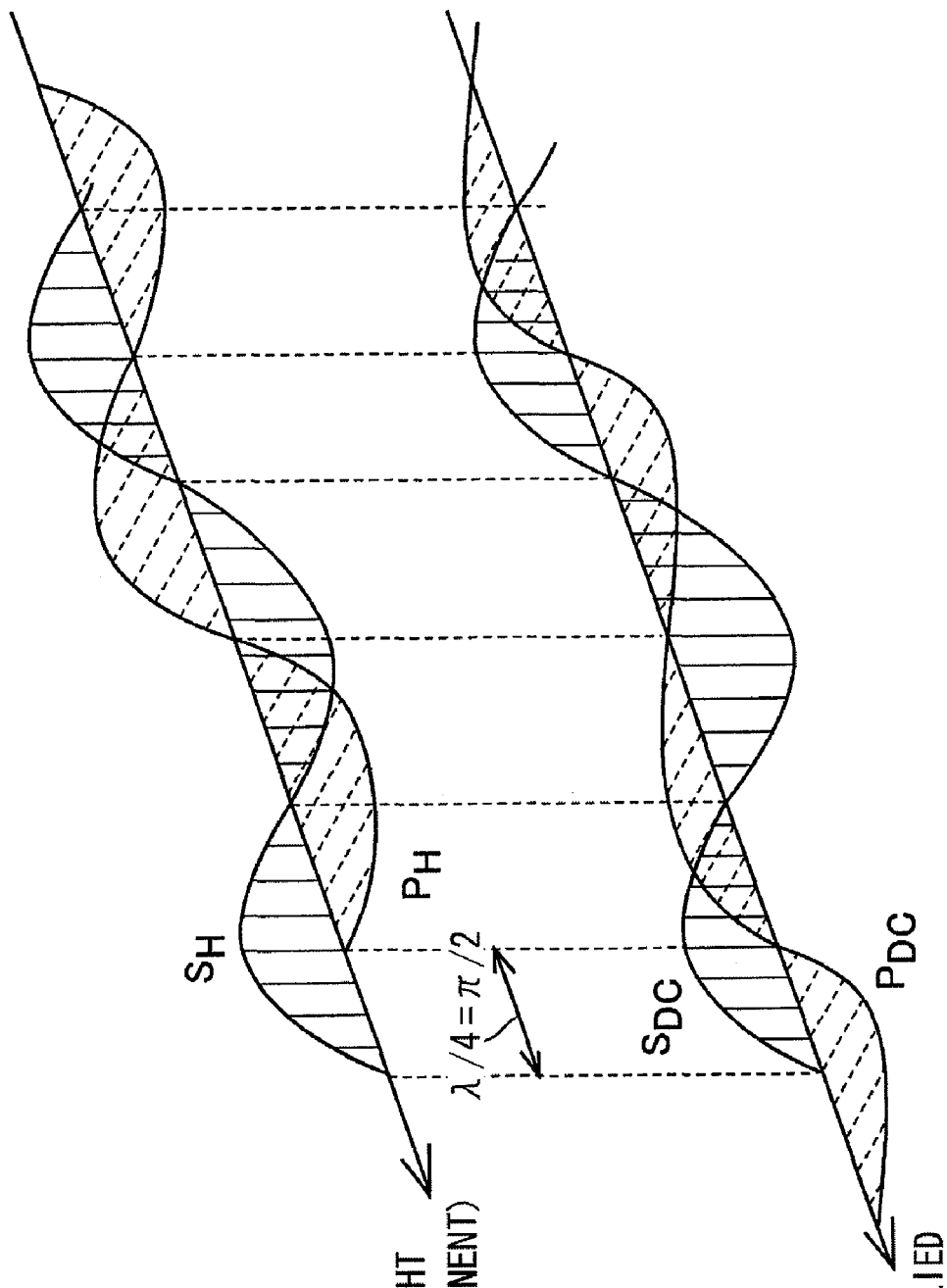

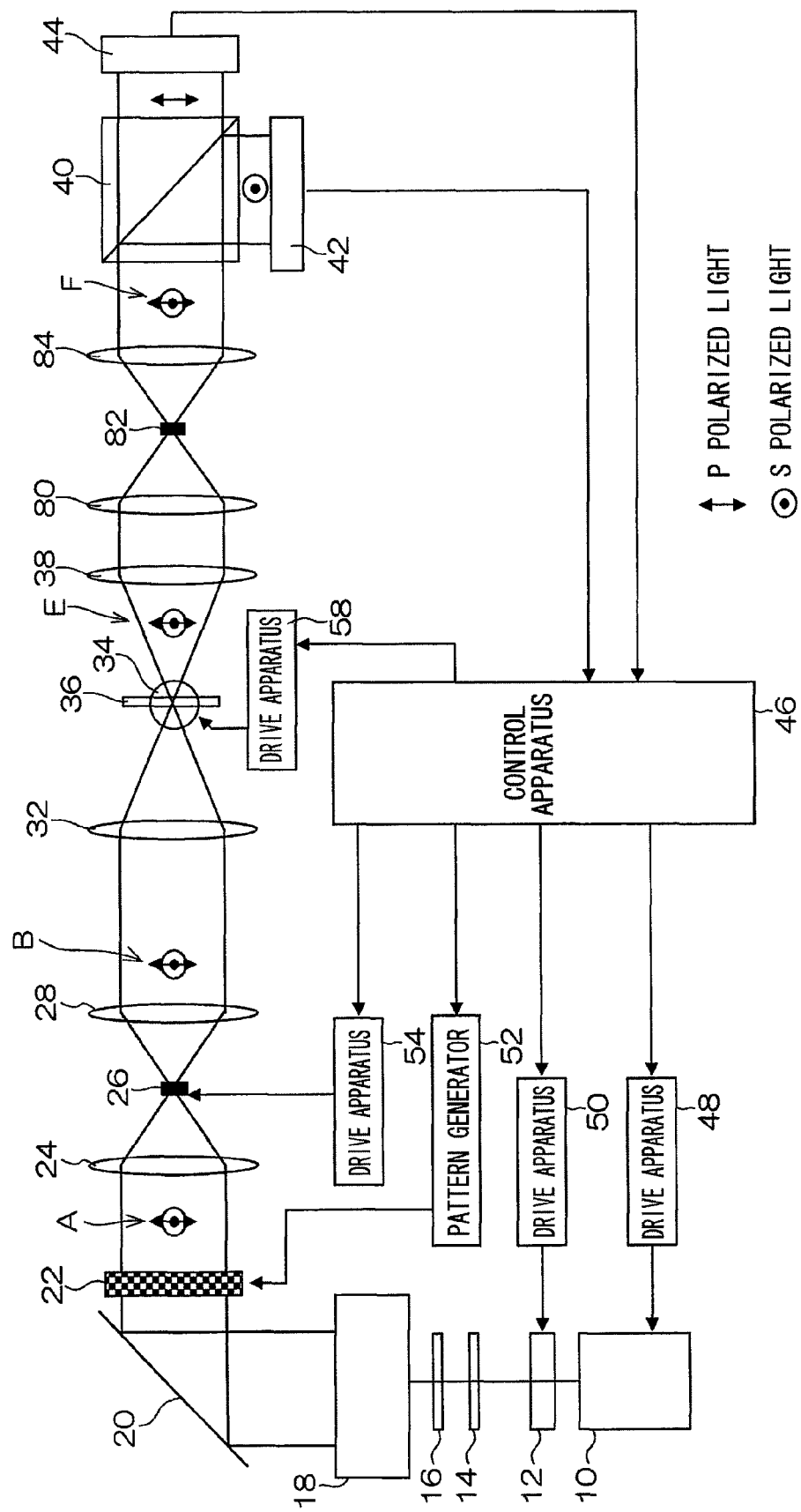

POLARIZATION-BASED HOLOGRAPHIC OPTICAL REPRODUCING APPARATUS INCLUDING DC MODULATING ELEMENT

CROSS-REFERENCE TO RELATED APPLICATIONS

This application is based on and claims priority under 35 USC 119 from Japanese Patent Application No. 2008-099809 filed Apr. 7, 2008 and No. 2009-002444 filed Jan. 8, 2009.

BACKGROUND

1. Technical Field of the Invention

The invention relates to an optical reproducing method and an optical reproducing apparatus.

2. Related Art

In a holographic data storage, a signal light pattern representing digital data per one page in a brightness image is displayed on a spatial light modulator, a signal light modulated per pixel is generated, and the signal light is Fourier transformed by a lens and the transformed signal light is irradiated onto an optical recording medium together with a reference light. The Fourier transformed hologram of the data page is recorded in the optical recording medium due to interference between the signal light and the reference light. Plural pages of holograms may be recorded in a multiplex manner according to various multiplexing methods such as an angular multiplexing, in which an angle of incidence of the reference light is changed, for example.

In recent days, there has been proposed "coaxial recording method (collinear method)" as a recording and reproducing method of a holographic memory. In this collinear method, the signal light and the reference light are generated by modulating using the same spatial light modulator. The generated signal light and reference light are condensed by the same lens to have a common optic axis. The hologram is recorded in the optical recording medium due to interference between the signal light and the reference light. The signal light is reproduced from the recorded hologram by irradiating the reference light as a reading light.

In a case of executing a hologram reproducing method for obtaining a reproduced image by applying a direct-current component to a diffracted light, while using the collinear method mentioned above, a reference light and a direct-current component to be applied are generated using the same spatial light modulator at a time of reproducing. Accordingly, in order to apply the direct-current components in different phases for the positive image and the negative image, it is necessary to perform reproducing operation twice.

SUMMARY OF THE INVENTION

According to an aspect of the invention, there is provided an optical reproducing method including: generating a diffracted light, which is a polarized light including a first polarization component with a first polarization plane and a second polarization component with a second polarization plane that is orthogonal to the first polarization plane, by simultaneously condensing a signal light representing digital data in a brightness image and a reference light onto an optical recording medium, and irradiating the reference light as a reading light onto a hologram recorded in the optical recording medium due to interference between the signal light and the reference light; generating a combined light by applying a direct-current component formed by a polarized light having a third polarization component with the first polarization plane having a polarization direction orthogonal to the diffracted light and having the same phase as the diffracted light, and a fourth polarization component with the second polarization plane having an opposite phase to the diffracted light, onto the diffracted light; separating the combined light obtained by combining the diffracted light and the applied direct-current component into a fifth polarization component including the first polarization component and the third polarization component, and a sixth polarization component including the second polarization component and the fourth polarization component; and reproducing a first reproduced image from the separated fifth polarization component and reproducing a second reproduced image from the separated sixth polarization component.

BRIEF DESCRIPTION OF THE DRAWINGS

Exemplary embodiments of the invention will be described in detail based on the following figures, wherein:

FIG. 1 is a schematic view showing a structure of an optical recording and reproducing apparatus according to an exemplary embodiment of the present invention;

FIG. 4A is a view showing a polarized state of a high order component of a diffracted light in a space D;

FIG. 4B is a view showing a polarized state of a direct-current component to be applied in the space D;

FIG. 5 is a schematic view showing a structure of an optical recording and reproducing apparatus according to a second exemplary embodiment of the present invention;

FIG. 7A is a view showing a polarized state of a high order component of a diffracted light in a space D';

FIG. 7B is a view showing a polarized state of a direct-current component to be applied in the space D';

FIG. 8 is a schematic view showing a structure of a modified example of the optical recording and reproducing apparatus according to the exemplary embodiment of the present invention.

DETAILED DESCRIPTION

Figure 2A:
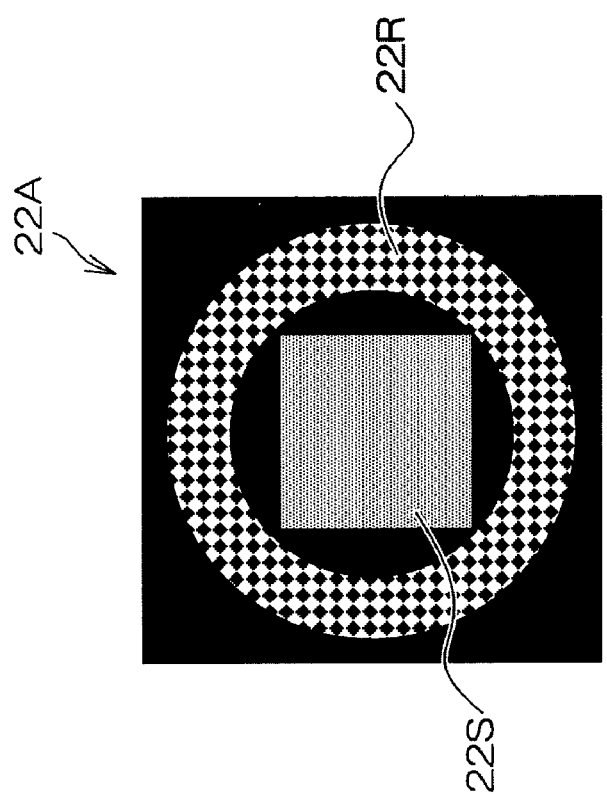
FIG. 2A is a plan view showing a display region defined on a display surface of a spatial light modulator and an example of a pattern for recording displayed in the region.

An example of exemplary embodiments according to the present invention will be described in detail with reference to the accompanying drawings.

First Exemplary Embodiment

In a first exemplary embodiment, a case of recording a hologram with a direct-current component removed at a time of recording, and reproducing the hologram by applying the direct-current component at a time of reproducing. In more detail, at a time of recording, direct-current components of a signal light and a reference light are removed and then hologram is recorded due to interference of the signal light with the reference light, from both of which the direct-current components are removed. At a time of reproducing, the reference light for reading is irradiated to the hologram, and then the direct-current component is applied to a diffracted light diffracted from the hologram. The diffracted light to which the direct-current component is applied is separated into two polarized light components which are orthogonal to each other, a brightness image of the original signal light is reproduced from one polarized light component, and a reverse image of the original signal light is reproduced from the other polarized light component.

There is a case that the reverse image may not be always obtained depending on a white rate (a rate of bright pixels in a whole of the brightness image) or the like. However, a noise caused by a reproduction optical system may be removed even in such a case. In this specification, as a matter of convenience, two reproduced images are called as a "positive image" and a "negative image".

An optical reproducing method according to the present invention may be executed whichever the diffracted light is a linearly polarized light or a circularly polarized light. However, in the first exemplary embodiment, a case that the hologram is recorded and reproduced by using a signal light of a linearly polarized light and a reference light of the light will be described.

(Schematic Structure of Optical Recording and Reproducing Apparatus)

FIG. 1 is a schematic view showing a structure of an optical recording and reproducing apparatus according to an exemplary embodiment of the present invention. This optical recording and reproducing apparatus corresponds to an optical recording and reproducing apparatus of "coaxial recording method (collinear method)" irradiating a signal light and a reference light having a common optic axis as one light flux of recording light from the same direction. In this exemplary embodiment, an optical recording and reproducing apparatus of "coaxial transmission type" using a reflection type spatial light modulator (SLM) and a transmission type optical recording medium.

The optical recording and reproducing apparatus is provided with a light source 10 emitting a laser light, which is a coherent light. As the light source 10, a laser light source emitting a green laser light having an oscillating wavelength 532 nm is used, for example. On light emitting side of the light source 10, a shutter 12 capable of inserting to or retracting from an optical path (opening or closing); a half-wave plate 14 which gives an optical path difference of one half wavelength between the orthogonal straight polarization components; a polarizing plate 16 through which a light in a predetermined polarizing direction pass; a beam expander 18 which expands and collimates the incident light; and a reflection mirror 20, are arranged in this order along the optical path from the side of the light source 10.

In this case, the shutter 12, the half-wave plate 14 and the polarizing plate 16 may be omitted. In this exemplary embodiment, as described in FIG. 1, a description will be given by referring to a light having a polarization plane transmitting through a polarization beam splitter 40 to be mentioned below (a first polarization plane: a parallel direction to a paper surface of FIG. 1, in this exemplary embodiment) as a "P polarized light", and referring to a light in a polarization plane reflected by the polarization beam splitter 40 (a second polarization surface: an orthogonal direction to the paper surface of FIG. 1, in this exemplary embodiment) as "S polarized light".

The light source 10 is connected to a control apparatus 46 via a drive apparatus 48. The control apparatus 46 is formed by a personal computer or the like including a CPU, an ROM, an RAM, an external memory device, an input device and an output device. The light source 10 is driven by the drive apparatus 48 according to a control signal input to the drive apparatus from the control apparatus 46. The shutter 12 is connected to the control apparatus 46 via a drive apparatus 50. The shutter 12 is driven by the drive apparatus 50 so as to open and close, according to the control signal input to the drive apparatus 50 from the control apparatus 46.

A transmission type spatial light modulator 22 for performing polarization modulation on an incident light per pixel is arranged on a light reflection side of the reflection mirror 20. As the transmission type spatial light modulator 22, a liquid crystal type spatial light modulating element such as a liquid crystal shutter array or the like may be used. The spatial light modulator 22 is connected to the control apparatus 46 via a pattern generator 52. Each of the pixel portions of the spatial light modulator 22 is driven by controlling by the control apparatus 46.

The pattern generator 52 represents digital data supplied from the control apparatus 46 in a brightness image and generates a signal light pattern to be displayed on the spatial light modulator 22. The signal light pattern is a digital pattern or the like in which binary digital data "0, 1" is represented by "dark (black pixel), bright (white pixel)", for example. A reference light pattern is also displayed on the spatial light modulator 22, in addition to the signal light pattern. The reference light pattern is a random pattern or the like, for example. The spatial light modulator 22 modulates the incident laser light according to the displayed signal light pattern or reference light pattern, and generates the signal light or the reference light. The spatial light modulator 22 emits the generated signal light or reference light to a lens 24 side to be mentioned below.

FIG. 2A is a plan view showing an example of a display region defined on a display surface 22A of the spatial light modulator 22 and a pattern for recording displayed on the region. A signal light region 22S and a reference light region 22R are previously defined on the display surface 22A of the spatial light modulator 22 depending on a size of the display surface 22A. Shapes and sides of the signal light region 22S and the reference light region 22R may be appropriately changed.

As shown in FIG. 2A, in this exemplary embodiment, a rectangular signal light region 22S and a ring-shaped reference light region 22R surrounding the signal light region 22S are respectively arranged on the display surface 22A of the spatial light modulator 22. A signal light pattern for generating the signal light is displayed in the signal light region 22S, at a time of recording. A reference light pattern for generating the reference light is displayed in the reference light region 22R, at a time of recording.

Figure 2B:
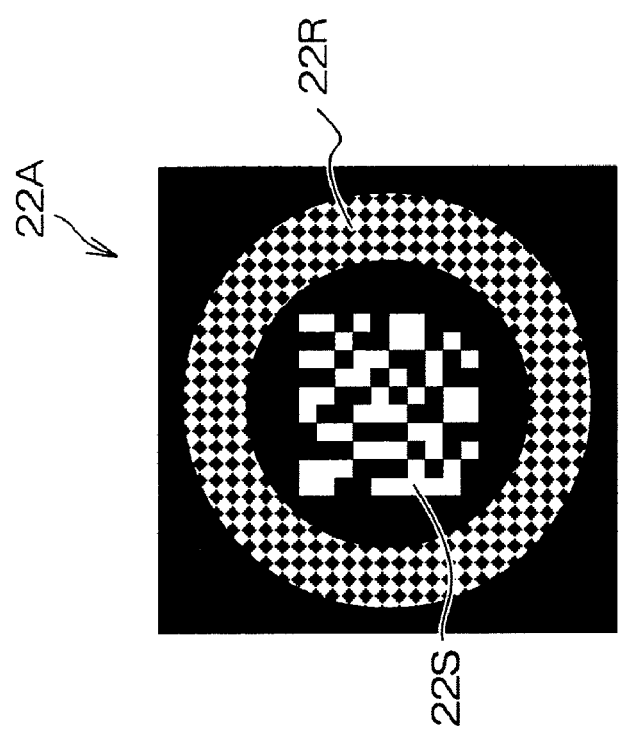
FIG. 2B is a plan view showing an example of a pattern for reproducing displayed on the display surface of the spatial light modulator.

FIG. 2B is a plan view showing an example of a pattern for reproducing displayed on the display surface 22A of the spatial light modulator 22. The reference light pattern for generating the reference light is displayed in the reference light region 22R at a time of reproducing. The transmission pattern for generating the direct-current component to be applied is displayed in the signal light region 22S at a time of reproducing. The transmission pattern includes a group of pixels having the same brightness except 0. An amplitude and a phase of the laser light input to the signal light region 22S may be modulated uniformly by this transmission pattern, and the direct-current component to be applied is generated.

As mentioned above, in the hologram regenerating method for obtaining two reproduced images including a positive image and a negative image, a positive image is reproduced by applying the direct-current component, which is in the same phase as the diffracted light, to the diffracted light obtained from the hologram. A negative image is reproduced by applying the direct-current component, which is in the opposite phase to the diffracted light, to the diffracted light obtained from the hologram. In the case of using a photo polymer in which an intensity distribution of an interference fringes of the recording light and a refractive index distribution formed due to the intensity distribution are in the same phase (a shift amount of phase=0), is used as the recording medium of the hologram, the phase of the diffracted light is shifted by $\pi/2$ from the phase of the reference light for reading. In this case, if the phase of the direct-current component to be applied is shifted by $\pi/2$ with respect to the reference light, the diffracted light and the direct-current component to be applied will be in the same phase or the opposite phase.

In the case of setting the shift amount of phase between the intensity distribution of the interference fringes of the recording light and the refractive index distribution formed due to the intensity distribution to $\theta$, a value of the shift amount $\theta$ is different according to the hologram recording material. Examples of the recording medium having different phase differences between the reference light for reading and the diffracted light as mentioned above include a photorefractive crystal (a lithium niobate ($LiNbO_3$), a barium titanate ($BaTiO_3$) and the like), having $\theta=\pi/2$. And, the examples include an azopolymer having $\theta=\pi$. Further, in the case of a hologram formed only from a light absorption rate distribution such as a silver salt material, $\theta=\pi$.

In these cases, the phase difference between the reference light for reading and the diffracted light from the hologram is $\pi/2+\theta$. In this case, a positive image or a negative image may be obtained by determining the phase of the direct-current component to be applied so that the phase of the direct-current component to be applied is the same phase as or the opposite phase to the diffracted light, in the similar manner described above. A description will be given below by exemplifying a case that the photo polymer is used as the recording medium, for simplification. In other words, it is a case of $\theta=0$. However, as to be mentioned below, the recording medium according to the invention is not limited to the photo polymer, and any recording medium may be used.

In this exemplary embodiment, the photo polymer is used as the recording medium as mentioned above, and the amplitude and the phase of the incident laser light are modulated by the spatial light modulator 22, in such a manner that the phase of the applied direct-current component is shifted by $\pi/2$ with respect to the phase of the reference light, on the assumption that the phase of the diffracted light is shifted by $\pi/2$ from the phase of the reference light for reading, at a time of reproducing. The polarizing direction of the incident laser light is controlled by the spatial light modulator 22. A polarization modulation by the spatial light modulator 22 will be described later.

On a light transmission side of the spatial light modulator 22, the lens 24; a direct-current component removing element 26 capable of inserting to or retracting from the optical path; a lens 28; a direct-current component modulating elements 30 capable of inserting to of retracting from the optical path; and a lens 32, are arranged in this order along the optical path from the side of the spatial light modulator 22. The lens 24, the lens 28 and the lens 32 are constituted by a Fourier transform lens. The lens 24 Fourier transforms and condenses the incident light and irradiates the incident light onto the direct-current component removing element 26. The lens 28 inverse Fourier transforms and collimates the incident light and relays the light to the lens 32. Further, the lens 32 Fourier transforms and condenses the incident light and irradiates the light onto an optical recording medium 36 to be mentioned below.

The direct-current component removing element 26 is arranged in the Fourier transform plane of the lens 24, that is, a frequency space existing between the lens 24 and the lens 28. The direct-current component removing element 26 is inserted to the optical path at a time of recording to remove a direct-current component (a zero-order diffracted light component) in the frequency space. The direct-current component removing element 26 is connected to the control apparatus 46 via the drive apparatus 54. The direct-current component removing element 26 is driven by the drive apparatus 54 to be moved according to the control signal input from the control apparatus 46 to the drive apparatus 54.

As the direct-current component removing element 26, a light absorption filter for absorbing only the direct-current component, such as a transparent substrate on which a black pigment is applied, an ND filter arranged near the optic axis and the like, and a partial reflection mirror for reflecting only the direct-current component, such as a transparent substrate in which a reflection film is applied near the optic axis and the like, for example may be used on an optical path (near an optic axis) of the direct-current component.

The direct-current component modulating element 30 is arranged between the lens 28 and the lens 32. Since the direct-current component applied at a time of reproducing is generated by the signal light region 22S of the spatial light modulator 22, it passes through the signal light optical path as the signal light. Therefore, the direct-current component modulating element 30 is arranged on the optical path of the applied direct-current component, that is, the signal light optical path. The direct-current component modulating element 30 is inserted to the optical path at a time of reproducing, and rotates the polarization plane of the applied direct-current component. The direct-current component modulating element 30 is connected to the control apparatus 46 via the drive apparatus 56. The direct-current component modulating element 30 is driven by the drive apparatus 56 and moved, according to the control signal input to the drive apparatus 56 from the control apparatus 46.

As the direct-current component modulating element 30, a half-wave plate may be used, for example. In the case that a half-wave plate is used as the direct-current component modulating element 30, the polarization plane of the direct-current component to be applied is rotated by 90 degrees at a time of reproducing. A method of arranging the direct-current component modulating element 30 will be described below.

A holding stage 34 holding an optical recording medium 36 is provided on a light emitting side of the lens 32. The holding stage 34 is connected to the control apparatus 46 via the drive apparatus 58. The holding stage 34 is driven according to a control signal input to the drive apparatus 58 from the control apparatus 46, and is moved in a direction of an optic axis or a surface direction which is perpendicular to the optic axis. The holding stage 34 holds the optical recording medium 36 at a reference position at which a center position in a film thickness direction of the optical recording medium 36 comes to a focal point position of the lens 32, for example.

The optical recording medium 36 is an optical recording medium capable of recording the hologram due to a refractive index change caused by a light irradiation. Examples for the optical recording medium 36 include an optical recording medium using recording materials such as a photo polymer material, a photo refractive material, a silver salt photosensitive material and the like. In this exemplary embodiment, a case using the optical recording medium using the photo polymer material will be described, as mentioned above.

On a light transmission side of the optical recording medium 36, a lens 38; and a polarization beam splitter 40 reflecting a light in a predetermined polarizing direction and transmitting the light in the polarizing direction which is orthogonal thereto are arranged. In this case, the polarization beam splitter 40 reflects an S polarized light component and transmits a P polarized light component which is orthogonal thereto. A sensor array 42 is arranged on a light reflection side of the polarization beam splitter 40. The sensor array 42 receives the S polarized light component. A sensor array 44 is also arranged on a light transmission side of the polarization beam splitter 40. The sensor array 44 receives the P polarized light component.

The sensor arrays 42 and 44 are formed by two-dimensional imaging elements such as a CCD, a CMOS array or the like, and convert the received light into an electric signal so as to output. Each of the sensor arrays 42 and 44 is connected to the control apparatus 46. Each of the sensor arrays 42 and 44 picks a reproduced image formed on the light receiving surface, converts into an image data, and outputs to the control apparatus 46.

The control apparatus 46 compares a first reproduced image picked by the sensor array 42 with a second reproduced image picked by the sensor array 44; determines a difference value of brightness per pixel; and generates a third reproduced image on the basis of the obtained difference values. The control apparatus 46 decodes the digital data superposed on the signal light on the basis of the third reproduced image.

(Polarizing Direction of Emitted Light of Spatial Light Modulator)

The optical recording and reproducing apparatus shown in FIG. 1 is designed such that the polarization plane of the linearly polarized light emitted from the spatial light modulator 22 does not become perpendicular or parallel to the polarization plane of any polarized light component (the S polarized light component or the P polarized light component) emitted from the polarization beam splitter 40. In other words, both the S polarized light component and the P polarized light component are included in the polarized light emitted from the spatial light modulator 22.

Although details will be described later, the diffracted light from the hologram and the applied direct-current component incident to the polarization beam splitter 40, and are separated into the S polarized light component and the P polarized light component and then emitted. They form the positive reproduced image and the negative reproduced image. In order to generate the reproduced images at a high contrast, it is desirable to match phases (to the same phase or the inverse phase) of the applied direct-current component and the high order component, which is the diffracted light. For this purpose, it is preferable to design the polarization plane of the emitted light from the spatial light modulator 22 in such a manner as to form a relative angle of about 45 degrees, with respect to the polarization plane of the emitted light from the polarization beam splitter 40.

(Recording Operation of Optical Recording and Reproducing Apparatus)

Next, a recording operation of the optical recording and reproducing apparatus shown in FIG. 1 will be explained.

At the time of recording a hologram, first of all, the shutter 12 is opened, the direct-current component removing element 26 is inserted, the direct-current component modulating element 30 is retracted, and the laser light is irradiated from the light source 10. At the same time, the pattern for recording is displayed on the spatial light modulator 22 (refer to FIG. 2A). Other than retracting the direct-current component modulating element 30, a non-modulation state may be formed by using the half-wave plate 14 or the like. The laser light emitted from the light source 10 passes through the shutter 12, and the polarizing direction is adjusted by the half-wave plate 14 and the polarization plate 16 as needed. It is possible to be non-modulation state by rotating an optic axis of the direct-current component modulating element 30 so as to make the optic axis parallel to the polarizing direction of the incident light.

The light passed through the polarization plate 16 is converted into a collimated light of a large diameter by the beam expander 18, the collimated light is reflected by the reflection mirror 20, and is irradiated to the spatial light modulator 22. The laser light is modulated according to the displayed pattern for recording, and the signal light and the reference light are generated, in the spatial light modulator 22. The signal light and the reference light generated from the spatial light modulator 22 include both the S polarized light component and the P polarized light component, as mentioned above, and this will be described in detail in the explanation of the reproducing operation. In the case that the polarization plane of the emitted light from the spatial light modulator 22 is a plane which is rotated by 45 degrees relative to both the P polarized light and the S polarized light, the S polarized light component and the P polarized light component included in the emitted light have the same amplitude, and the same phase.

In this exemplary embodiment, the signal light region 22S and the reference light region 22R are defined on the spatial light modulator 22, as shown in FIG. 2A. The laser light coming to the signal light region 22S is modulated according to the displayed signal light pattern, and the signal light is generated. The laser light coming to the reference light region 22R is modulated according to the displayed reference light pattern, and the reference light is generated.

The recording light (the signal light and the reference light) generated by the spatial light modulator 22 are condensed by the lens 24, and are irradiated onto the direct-current component removing element 26. An unnecessary frequency component of the recording light condensed by the lens 24 is cut by the direct-current component removing element 26, and the remaining portion passes through the direct-current component removing element 26. In other words, the zero-order diffracted component is cut off (the direct-current component is removed), and a first-order or higher diffraction components are transmitted by the direct-current component removing element 26. The recording light that is not removed by the direct-current component removing element 26 and passed through it is converted into the collimated light by the lens 28.

The recording lights converted into the parallel lights by the lens 28, that is, the signal light and the reference light from which the direct-current component is removed, are Fourier transformed and condensed by the lens 32, and simultaneously and coaxially irradiated to the optical recording medium 36. At the position where the signal light and the reference light are condensed, the interference fringes formed by the interference between the signal light and the reference light are recorded as the hologram in the optical recording medium 36.

(Reproducing Operation of Optical Recording and Reproducing Apparatus)

Next, the reproducing operation of the optical recording and reproducing apparatus shown in FIG. 1 will be explained.

At the time of reading (reproducing) the data recorded in the optical recording medium 36, the shutter 12 is opened, the direct-current component removing element 26 is retracted, the direct-current component modulating element 30 is inserted, and the laser light is irradiated from the light source 10. At the same time, the pattern for reproducing is displayed on the spatial light modulator 22 (refer to FIG. 2B). The laser light emitted from the light source 10 passes through the shutter 12, the light intensity and the polarizing direction thereof are adjusted by the half-wave plate 14 and the polarization plate 16, is converted into a parallel light of a large diameter by the beam expander 18, is reflected by the reflection mirror 20, and is irradiated to the spatial light modulator 22 similarly to the case of recording. In the spatial light modulator 22, the laser light is modulated according to the displayed pattern for reproducing, and the reference light and the direct-current component to be applied are generated.

In this exemplary embodiment, as shown in FIG. 2B, the signal light region 22S and the reference light region 22R are defined on the spatial light modulator 22. The laser light coming to the reference light region 22R is modulated according to the displayed reference light pattern, and the reference light for reading is generated. The laser light coming to the signal light region 22S is modulated according to the displayed transmission pattern, and the direct-current component having the phase difference of $\pi/2$ from the reference light is generated.

The reference light and the direct-current component which are generated by the spatial light modulator 22 are relayed by the lenses 24 and 28, and are formed as the collimated lights by the lens 28. The direct-current component formed as the collimated light by the lens 28 passes through the signal light optical path, the polarization plane is rotated by 90 degrees by the direct-current component modulating element 30 arranged on the signal light optical path, and comes to the lens 32. When the polarization plane is rotated by 90 degrees, the phase difference of the S polarized light component with respect to the P polarized light component becomes 7. The reference light formed as the collimated light by the lens 28 passes through the reference light optical path and come to the lens 32. The reference light and the direct-current component comes to the lens 32 are Fourier transformed and condensed by the lens 32, and are irradiated to the region where the hologram is recorded in the optical recording medium 36.

In other words, the reference light is irradiated as the reading light on the optical recording medium 36, and the direct-current component having the phase shifted by $\pi/2$ from the reference light and having the polarizing direction orthogonal to the reference light is irradiated. The irradiated reference light is diffracted by the hologram at a time of transmitting the optical recording medium 36, and the transmitted diffracted light having the phase shifted by $\pi/2$ from the reference light is emitted toward the lens 38. The applied direct-current component transmits the optical recording medium 36 without being diffracted. As a result, the direct-current component having the phase shifted by $\pi/2$ from the reference light is emitted toward the lens 38.

Figure 3B:
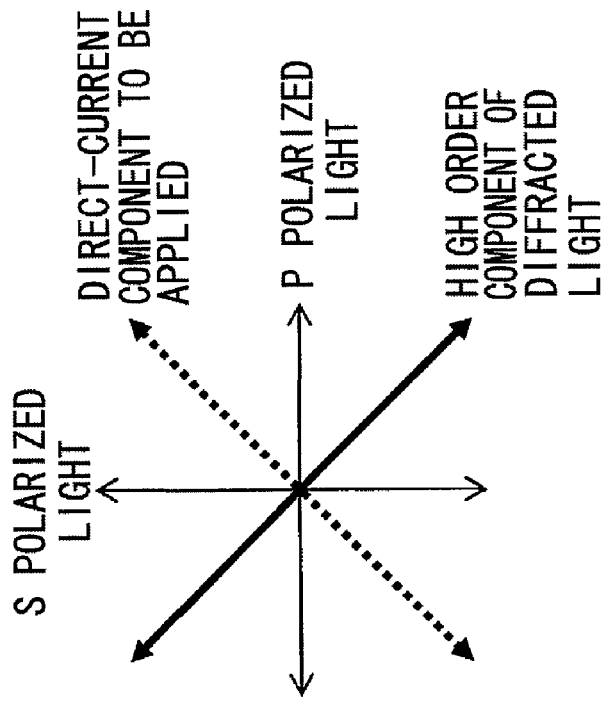
FIGS. 3A and 3B are views explaining a polarized state of a reference light and a direct-current component to be applied.
Figure 3A:
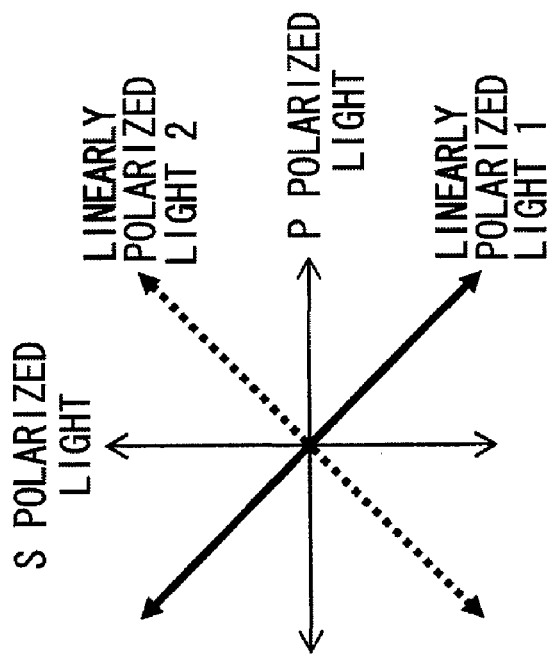

FIGS. 3A and 3B are views explaining the polarization state of the reference light and the direct-current component to be applied. As shown in FIG. 3A, the reference light and the direct-current component which are generated by the spatial light modulator 22 are "linearly polarized light 1" having constant oscillating directions of an electric field and a magnetic field, in "space A" existing between the spatial light modulator 22 and the lens 24. The oscillating direction of "linearly polarized light 1" is inclined at 45 degrees with respect to the perpendicular direction to the paper surface of FIG. 1, according to the angle of rotation about the optic axis of the spatial light modulator 22. In other words, "linearly polarized light 1" has a polarization plane which is inclined at 45 degrees with respect to both of the polarization planes of the P polarized light and the S polarized light.

The reference light and the direct-current component are "linearly polarized light 1" in "space B" obtained by excluding a space in a downstream side of the direct-current component modulating element 30 from the space existing between the lens 28 and the lens 32. The polarization plane of the direct-current component to be applied is rotated by 90 degrees by the direct-current component modulating element 30, in "space C" existing in the downstream side of the direct-current component modulating element 30, and is converted into "linearly polarized light 2" having the polarizing direction orthogonal to "linearly polarized light 1". In FIG. 3A, "linearly polarized light 1" is shown by a solid line, and "linearly polarized light 2" is shown by a dotted line.

As shown in FIG. 3B, regarding to the diffracted light emitted from the optical recording medium 36 and the direct-current component to be applied, the high order component of the diffracted light is a linearly polarized light having the same polarizing direction as "linearly polarized light 1", and the direct-current component to be applied is a linearly polarized light having the same polarizing direction as "linearly polarized light 2", in "space D" existing in the downstream side of the optical recording medium 36. In other words, the high order component of the diffracted light and the direct-current component to be applied are the linearly polarized lights having the polarizing directions orthogonal to each other. The linearly polarized light may be separated into the S polarized light component which is perpendicular to the paper surface of FIG. 1, and the P polarized light component which is parallel to the paper surface of FIG. 1.

The diffracted light emitted from the optical recording medium 36 and the direct-current component to be applied are inverse Fourier transformed and formed as the collimated lights by the lens 38, and come to the polarization beam splitter 40. The S polarized light components of the diffracted light and the direct-current component to be applied are reflected by the polarized light beam splitter 40, and come to the sensor array 42. A first reproduced image generated by the S polarized light component is formed on the light receiving surface of the sensor array 42. The P polarized light components of the diffracted light and the direct-current component to be applied transmit the polarization beam splitter 40, and come to the sensor array 44. A second reproduced image generated by the P polarized light component is formed on the light receiving surface of the sensor array 44.

At the time of recording the hologram due to the interference between the signal light with the direct-current component removed and the reference light, if the reference light for reading is irradiated on the hologram, the signal light with the direct-current component removed is reproduced as the diffracted light. By applying the direct-current component, which has the same phase as the diffracted light, to the diffracted light, the original signal light is restored and then the brightness image (the positive image) of the original signal light is reproduced. By applying the direct-current component, which has the opposite phase to the diffracted light, to the diffracted light, the reverse image (the negative image) of the brightness image of the original signal light is reproduced.

As a result that the phase of the diffracted light is shifted by $\pi/2$ from the phase of the reference light, and the phase of the direct-current component is shifted by $\pi/2$ from the phase of the reference light, there may be two cases including a case that the phase of the high order component of the diffracted light becomes same as the phase of the direct-current component to be applied, and a case that the phase of the high order component of the diffracted light becomes opposite to the phase of the direct-current component to be applied. In the case of the same phase, the positive amplitude is increased due to the interference between the diffracted light (the high order component) and the direct-current component and thus the positive image is reproduced. In the case of the opposite phase, the absolute value of the negative amplitude is increased due to the interference between the diffracted light and the direct-current component and thus the negative image is reproduced.

In this exemplary embodiment, the S polarized light component of the high order component of the diffracted light has the same phase as the S polarized light component of the direct-current component to be applied. Accordingly, the S polarized light component of the high order component of the diffracted light is combined with the S polarized light component of the direct-current component having the same phase, and thus the positive image is reproduced as the first reproduced image. The P polarized light component of the high order component of the diffracted light has the opposite phase to the P polarized light component of the direct-current component to be applied. Accordingly, the P polarized light component of the high order component of the diffracted light is combined with the P polarized light component of the direct-current component having the opposite phase, and thus the negative image is reproduced as the second reproduced image.

This will be explained in the view of the polarized light state of the diffracted light and the applied direct-current component. FIG. 4A is a view showing the polarized light state of the high order component of the diffracted light in the space D, and FIG. 4B is a view showing the polarized light state of the direct-current component to be applied in the space D. As shown in FIG. 4A, the high order component of the diffracted light in the space D may be separated into an S polarized light component (SH) oscillating in an orthogonal direction to a forward moving direction of the light (a direction of an optic axis) (an orthogonal direction to the paper surface of FIG. 1), and a P polarized light component ($P_H$) oscillating in a parallel direction to the direction of the optic axis (a parallel direction to the paper surface of FIG. 1). Similarly, as shown in FIG. 4B, the direct-current component to be applied in the space D may be separated into an S polarized light component ($S_{DC}$) oscillating in the orthogonal direction to the direction of the optic axis (the orthogonal direction to the paper surface of FIG. 1), and a P polarized light component ($P_{DC}$) oscillating in the parallel direction to the direction of the optic axis (the parallel direction to the paper surface of FIG. 1).

As can be seen from FIGS. 4A and 4B, the S polarized light component of the high order component of the diffracted light ($S_H$) has the same phase as the S polarized light component of the direct-current component to be applied ($S_{DC}$), and both the lights are combined, whereby the positive image is reproduced as the first reproduced image. The P polarized light component of the high order component of the diffracted light ($P_H$) has the opposite phase to the P polarized light component of the direct-current component to be applied ($P_{DC}$), and both the lights are combined, whereby the negative image is reproduced as the second reproduced image.

Each of the sensor arrays 42 and 44 picks the reproduced image formed on the light receiving surface and converts into image data, and then outputs the image data to the control apparatus 46, at a time of reproducing. It is preferable to perform over-sampling, in which one pixel of the signal light data is received by a plurality of light receiving elements, in the sensor arrays 42 and 44. For example, one bit data is received by four (2×2) light receiving elements.

The control apparatus 46 computes a difference of brightness with regard to each of the pixels of the brightness image representing the signal light by subtracting the image data of the second reproduced image from the image data of the first reproduced image. The difference at a time of subtracting the brightness of the second reproduced image (the negative image) from the brightness of the first reproduced image (the positive image) becomes positive in the bright portion of the original brightness image, and becomes negative in the dark portion of the original brightness image. Since the second reproduced image comes to the reverse image of the first reproduced image, a contrast is enhanced in the image after the subtracting process (a third reproduced image), than in the first reproduced image and the second reproduced image.

Since the common noise to the first reproduced image and the second reproduced image is cancelled in the third reproduced image, the SNR is higher in the third reproduced image than each of the first reproduced image and the second reproduced image. In the control apparatus 46, the digital data superposed on the signal light is decoded on the basis of the third reproduced image. Since the third reproduced image is improved in the SNR, the binary digital data may be precisely decoded.

Second Exemplary Embodiment

In a second exemplary embodiment, the hologram is reproduced by using a signal light and a reference light of a circularly polarized light. Other than that, similarly to the first exemplary embodiment, the direct-current components of the signal light and the reference light are removed, and the hologram is recorded due to the interference between the signal light and the reference light with the direct-current components removed, at a time of recording. Also, the reference light for reading is irradiated to the hologram and the direct-current component is applied to the diffracted light diffracted from the hologram, at a time of reproducing. The diffracted light to which the direct-current component is applied is separated into two polarized light components which are orthogonal to each other, then the brightness image of the original light is reproduced from one polarized light component, and the reverse image of the original signal light is reproduced from the other polarized light component.

(Schematic Structure of Optical Recording and Reproducing Apparatus)

FIG. 5 is a schematic view showing a structure of an optical recording and reproducing apparatus according to a second exemplary embodiment of the present invention. The optical recording and reproducing apparatus has the same structure as the optical recording and reproducing apparatus according to the first exemplified exemplary embodiment shown in FIG. 1, except that a pair of lenses 70 and a lens 72, and a quarter-wave plate 74 are added between the spatial light modulator 22 and the lens 24 for converting the linearly polarized light into the circularly polarized light. Accordingly, the same reference numerals are provided to the same components, and a description thereof will not be repeated.

(Recording Operation of Optical Recording and Reproducing Apparatus)

Next, a recording operation of the optical recording and reproducing apparatus shown in FIG. 5 will be explained.

At the time of recording the hologram, first of all, the shutter 12 is opened, the direct-current component removing element 26 is inserted, the direct-current component modulating element 30 is retracted, and the laser light is irradiated from the light source 10. At the same time, the pattern for recording is displayed on the spatial light modulator 22 (refer to FIG. 2A). The laser light oscillated from the light source 10 passes through the shutter 12, and the light intensity and the polarizing direction are adjusted by the half-wave plate 14 and the polarization plate 16. For example, the light intensity of the S polarized light is adjusted by arranging the polarization plate 16 so as to transmit only the S polarized light, and controlling the polarizing direction of the laser light by the half-wave plate 14.

The light passed through the polarization plate 16 is converted into a parallel light of a large diameter by the beam expander 18, the parallel light is reflected by the reflection mirror 20, and is irradiated to the spatial light modulator 22. The laser light is modulated according to the displayed pattern for recording, and the signal light and the reference light are generated, in the spatial light modulator 22. The signal light and the reference light generated by the spatial light modulator 22 are linearly polarized lights having the polarization surface rotated by a predetermined angle (45 degrees in this case) about the optic axis.

The recording light of the linearly polarized light generated by the spatial light modulator 22 is relayed by the lens 70 and the lens 72, and is converted into the circularly polarized light by the quarter-wave plate 74. At the time of converting the recording light by the quarter-wave plate 74, an optical path difference of one quarter wavelength (a phase difference $\pi/2$) is applied between the S polarized light component and the P polarized light component of the recording light. The recording light converted into the circularly polarized light by the quarter-wave plate 74 is focused by the lens 24, and is irradiated to the direct-current component removing element 26. In the recording light focused by the lens 24, an unnecessary frequency component is cut by the direct-current component removing element 26, and the remaining portion passes through the direct-current component removing element 26. In other words the zero-order diffracted component is cut off (the direct-current component is removed), and the first-order or higher diffraction components are transmitted by the first current component removing element 26. The recording light passed through the direct-current component removing element 26 is converted into the parallel light by the lens 28.

The recording lights converted into the parallel lights by the lens 28, that is, the signal light and the reference light with the direct-current component removed, are Fourier transformed while remaining as the circularly polarized light and condensed by the lens 32, and simultaneously and coaxially irradiated to the optical recording medium 36. At the position where the signal light and the reference light are condensed, the interference fringes formed by the interference between the signal light and the reference light are recorded as the hologram in the optical recording medium 36.

(Reproducing Operation of Optical Recording and Reproducing Apparatus)

Next, the reproducing operation of the optical recording and reproducing apparatus shown in FIG. 5 will be explained.

At the time of reading (reproducing) the data recorded in the optical recording medium 36, the shutter 12 is opened, the direct-current component removing element 26 is retracted, the direct-current component modulating element 30 is inserted, and the laser light is irradiated from the light source 10. At the same time, the pattern for reproducing is displayed on the spatial light modulator 22 (refer to FIG. 2B). The laser light emitted from the light source 10 passes through the shutter 12, the light intensity and the polarizing direction thereof are adjusted by the half-wave plate 14 and the polarization plate 16, is converted into a parallel lights of a large diameter by the beam expander 18, is reflected by the reflection mirror 20, and is irradiated to the spatial light modulator 22 similarly to the case of recording.

In the spatial light modulator 22, the laser light is modulated according to the displayed pattern for reproducing, and the reference light and the direct-current component to be applied are generated. As the direct-current component to be applied, the direct-current component having the phase difference of $\pi/2$ from the reference light is generated. The signal light and the direct-current component generated by the spatial light modulator 22 are the linearly polarized light having the polarization surface rotated by a predetermined angle (45 degrees in this case) about the optic axis with respect to the incident surface. The reference light and the direct-current component of the linearly polarized light generated by the spatial light modulator 22 are relayed by the lens 70 and the lens 72, and are converted into the circularly polarized light by the quarter-wave plate 74. An optical path difference of one quarter wavelength (a phase difference of $\pi/2$) is applied between the S polarized light component and the P polarized light component of the reference light and the direct-current component, at a time of being converted into the circularly polarized light by the quarter-wave plate 74. The recording light converted into the circularly polarized light by the quarter-wave plate 74 is relayed by the lenses 24 and 28, and is formed as the parallel light by the lens 28.

The direct-current component formed as the collimated light by the lens 28 passes through the signal light optical path, and is converted into the inverse circularly polarized light by the direct-current component modulating element 30 arranged on the signal light optical path so as to come to the lens 32. The reference light formed as the collimated light by the lens 28 passes through the reference light optical path so as to come to the lens 32. The reference light and the direct-current component input to the lens 32 are Fourier transformed while remaining as the circularly polarized light and condensed by the lens 32, and are irradiated to the region in which the hologram is recorded in the optical recording medium 36.

In other words, the reference light is irradiated as the reading light on the optical recording medium 36, and the direct-current component having the phase shifted by $\pi/2$ from the reference light and having the polarizing direction orthogonal to the reference light (the rotating direction is opposite) is irradiated. The irradiated reference light is diffracted by the hologram at a time of transmitting the optical recording medium 36, and the transmitted diffracted light having the phase shifted by π/2 from the reference light is emitted toward the lens 38. The applied direct-current component transmits the optical recording medium 36 without being diffracted. As a result, the direct-current component having the phase shifted by π/2 from the reference light is emitted toward the lens 38.

Figure 6:
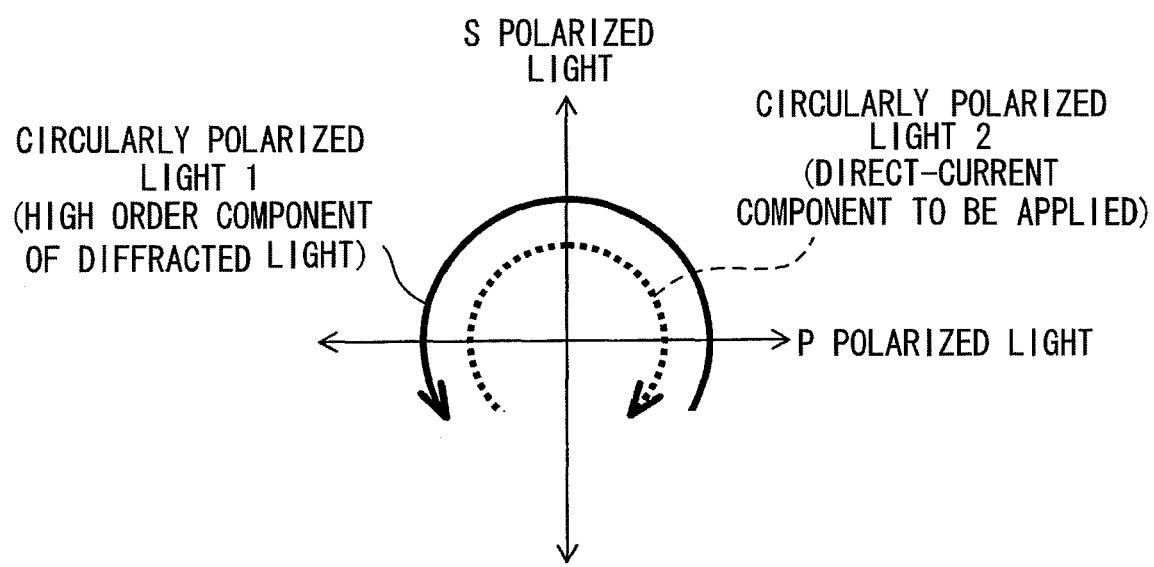
FIG. 6 is a view explaining a polarized state of a reference light and a direct-current component to be applied.

FIG. 6 is a view explaining the polarization state of the reference light and the direct-current component to be applied. As shown in FIG. 6, the reference light and the direct-current component of the linearly polarized lights, which are generated by the spatial light modulator 22, are converted into the circularly polarized light by the quarter-wave plate 74. In "space A'" existing between the quarter-wave plate 74 and the lens 24, it is "circularly polarized light 1" having the oscillating directions of the electric field and the magnetic field rotate in a constant direction about the optic axis.

The reference light and the direct-current component are "circularly polarized light 1" in "space B'" obtained by excluding a space in a downstream side of the direct-current component modulating element 30 from the space existing between the lens 28 and the lens 32. The polarization plane of the direct-current component to be applied is rotated by 90 degrees by the direct-current component modulating element 30, in "space C'" existing in the downstream side of the direct-current component modulating element 30, and is converted into "circularly polarized light 2" having the opposite rotating direction to "circularly polarized light 1". In FIG. 6, "circularly polarized light 1" is shown by a solid line, and "circularly polarized light 2" is shown by a dotted line.

As shown in FIG. 6, regarding to the diffracted light emitted from the optical recording medium 36 and the direct-current component to be applied, the high order component of the diffracted light is a circularly polarized light having the same rotating direction as "circularly polarized light 1", and the direct-current component to be applied is a circularly polarized light having the same rotating direction as "circularly polarized light 2", in "space D'" existing in the downstream side of the optical recording medium 36. In other words, the high order component of the diffracted light and the direct-current component to be applied are the circularly polarized lights having the rotating directions opposite to each other. The circularly polarized light may be separated into the S polarized light component having the oscillating direction perpendicular to the paper surface of FIG. 5, and the P polarized light component having the oscillating direction parallel to the paper surface of FIG. 5, similarly to the linearly polarized light.

The diffracted light emitted from the optical recording medium 36 and the direct-current component to be applied are inverse Fourier transformed and formed as the collimated lights by the lens 38, and come to the polarization beam splitter 40 while remaining as the circularly polarized light. The S polarized light components of the diffracted light and the direct-current component to be applied are reflected by the polarized light beam splitter 40, and come to the sensor array 42. A first reproduced image generated by the S polarized light component is formed on the light receiving surface of the sensor array 42. The P polarized light components of the diffracted light and the direct-current component to be applied transmit the polarization beam splitter 40, and come to the sensor array 44. A second reproduced image generated by the P polarized light component is formed on the light receiving surface of the sensor array 44.

At the time of recording the hologram due to the interference between the signal light with the direct-current component removed and the reference light, if the reference light for reading is irradiated on the hologram, the signal light with the direct-current component removed is reproduced as the diffracted light. By applying the direct-current component, which has the same phase as the diffracted light, to the diffracted light, the original signal light is restored and then the brightness image (the positive image) of the original signal light is reproduced. By applying the direct-current component, which has the opposite phase to the diffracted light, to the diffracted light, the reverse image (the negative image) of the brightness image of the original signal light is reproduced.

In this exemplary embodiment, the S polarized light component of the high order component of the diffracted light has the same phase as the S polarized light component of the direct-current component to be applied. Accordingly, the S polarized light component of the high order component of the diffracted light is combined with the S polarized light component of the direct-current component having the same phase, and thus the positive image is reproduced as the first reproduced image. The P polarized light component of the high order component of the diffracted light has the opposite phase to the P polarized light component of the direct-current component to be applied. Accordingly, the P polarized light component of the high order component of the diffracted light is combined with the P polarized light component of the direct-current component having the opposite phase, and thus the negative image is reproduced as the second reproduced image.

This will be explained from the point of view of the polarized light state of the diffracted light and the applied direct-current component. FIG. 7A is a view showing the polarized light state of the high order component of the diffracted light in the space D', and FIG. 7B is a view showing the polarized light state of the direct-current component to be applied in the space D'. As shown in FIG. 7A, the high order component of the diffracted light in the space D' may be separated into an S polarized light component ($S_H$) oscillating in a vertical direction to a forward moving direction of the light (a direction of an optic axis) (an orthogonal direction to the paper surface of FIG. 5), and a P polarized light component ($P_H$) oscillating in a parallel direction to the direction of the optic axis (a parallel direction to the paper surface of FIG. 5). Since the diffracted light is the circularly polarized light, the optical path difference of one quarter wavelength (the phase difference of π/2) exists between the S polarized light component and the P polarized light component of the high order component of the diffracted light.

Similarly, as shown in FIG. 7B, the direct-current component to be applied in the space D' may be separated into an S polarized light component ($S_{DC}$) oscillating in the orthogonal direction to the direction of the optic axis (the orthogonal direction to the paper surface of FIG. 5), and a P polarized light component ($P_{DC}$) oscillating in the parallel direction to the direction of the optic axis (the parallel direction to the paper surface of FIG. 5). Since the direct-current component to be applied is also the circularly polarized light, the optical path difference of one quarter wavelength (the phase difference of π/2) exists between the S polarized light component and the P polarized light component of the direct-current component to be applied.

As can be seen from FIGS. 7A and 7B, the S polarized light component of the high order component of the diffracted light ($S_H$) has the same phase as the S polarized light component of the direct-current component to be applied ($S_{DC}$), and both the lights are combined, whereby the positive image is reproduced as the first reproduced image. The P polarized light component of the high order component of the diffracted light ($P_H$) has the opposite phase to the P polarized light component of the direct-current component to be applied ($P_{DC}$), and both the lights are combined, whereby the negative image is reproduced as the second reproduced image.

Each of the sensor arrays 42 and 44 images the reproduced image formed on the light receiving surface and convert into image data, and then outputs the image data to the control apparatus 46, at a time of reproducing. The control apparatus 46 computes a difference of brightness with regard to each of the pixels of the brightness image representing the signal light by subtracting the image data of the second reproduced image from the image data of the first reproduced image. In the control apparatus 46, the digital date superposed on the signal light is decoded on the basis of the third reproduced image. Since the third reproduced image is improved in the SNR, the binary digital data may be precisely decoded.

In the first and second exemplary embodiments mentioned above, the optical recording and reproducing apparatus and method of "coaxial transmission type" using the transmission type optical recording medium are described, however, the present invention may be applied to an optical recording and reproducing apparatus and method of "coaxial reflection type" using a reflection type optical recording medium provided with a recording layer and a reflection layer made of an optical recording material.

In the first and second exemplary embodiments mentioned above, the case, in which the hologram is recorded with the direct-current component removed at a time of recording, and the hologram is reproduced by applying the direct-current component at a time of reproducing, is described, however, the hologram may be recorded without removing the direct-current component at a time of recording, and the hologram may be reproduced by applying the direct-current component only at a time of reproducing. In this case, if the reference light for reading is irradiated to the hologram, the signal light may be reproduced as a diffracted light. The brightness image (the positive image) of the original signal light may be reproduced by applying the direct-current component, which has the same phase as the diffracted light, to the diffracted light. The reverse image (the negative image) of the brightness image of the original signal light may be reproduced by applying the direct-current component, which has the opposite phase to the diffracted light, to the diffracted light.

In the first and second exemplary embodiments mentioned above, the example, in which the polarized light of the direct-current component to be applied is modulated (the polarization plane is rotated) at a time of reproducing, is described. However, the polarized light of the reference light for reading may be modulated, instead of the direct-current component to be applied. For example, in the optical recording and reproducing apparatus shown in FIG. 1, a wave plate (a high-order component modulating element) rotating the polarized light of only the reference light by 90 degrees is arranged instead of the direct-current component modulating element 30. Only the light passing through the reference light optical path is modulated by the high-order component modulating element. Accordingly, the negative image and the positive image may be simultaneously obtained as the reproduced image, by modulating the polarized light of the reference light for reading. Here, a forming principle of the reproduced image is as described with reference to FIG. 4.

In the first and second exemplary embodiments mentioned above, the example, in which the direct-current component modulating element is arranged on the light incident side of the hologram, is described, however, the direct-current component modulating element may be arranged on a light emitting side of the hologram. FIG. 8 is a schematic view showing a structure of an optical recording and reproducing apparatus in which the direct-current component modulating element is arranged on the light emitting side of the hologram. The optical recording and reproducing apparatus has the same structure as that shown in FIG. 1 according to the first exemplary embodiment except that the direct-current component modulating element 30 is eliminated, and a pair of lenses 80 and 84 and a direct-current component modulating element 82 are arranged between the lens 38 and the polarization beam splitter 40. Accordingly, the same reference numerals are provided to the same components, and a description thereof will not be repeated.

A pair of lenses 80 and 84 forming a relay system (4f system) are arranged on the light emitting side of the lens 38. The direct-current component modulating element 82 is arranged between the lens 80 and the lens 84. The polarization beam splitter 40 is arranged on a light emitting side of the lens 84. The direct-current component modulating element 82 is arranged in a Fourier transform plane of the lens 80, that is, a frequency space existing between the lens 80 and the lens 84. The direct-current component modulating element 82 modulates only the polarized light of the direct-current component (the zero-order diffracted light component) in the frequency space at a time of reproducing.

The reproducing operation of the optical recording and reproducing apparatus shown in FIG. 8 will be explained.

At the time of reading (reproducing) the data recorded in the optical recording medium 36, the shutter 12 is opened, the direct-current component removing element 26 is retracted, and the laser light is irradiated from the light source 10. At the same time, the pattern for reproducing is displayed on the spatial light modulator 22 (refer to FIG. 2B). The laser light emitted from the light source 10 passes through the shutter 12, the light intensity and the polarizing direction thereof are adjusted by the half-wave plate 14 and the polarization plate 16, is converted into a parallel light of a large diameter by the beam expander 18, is reflected by the reflection mirror 20, and is irradiated to the spatial light modulator 22 similarly to the case of recording. In the spatial light modulator 22, the laser light is modulated according to the displayed pattern for reproducing, and the reference light and the direct-current component to be applied are generated. In this exemplary embodiment, the reference light for reading and the direct-current component having the phase difference of $\pi/2$ from the reference light are generated similarly to the first exemplary embodiment.

The reference light and the direct-current component generated by the spatial light modulator 22 are relayed by the lens 24 and the lens 28, and are formed as the collimated lights by the lens 28. The reference light and the direct-current component formed as the collimated lights by the lens 28 come to the lens 32. The reference light and the direct-current component coming to the lens 32 are Fourier transformed by the lens 32 so as to be condensed, and are irradiated to the region in which the hologram is recorded in the optical recording medium 36.

In other words, the reference light is irradiated as the reading light on the optical recording medium 36, and the direct-current component in which the phase is shifted by $\pi/2$ from the reference light is irradiated. The irradiated reference light is diffracted by the hologram at a time of transmitting the optical recording medium 36, and the transmitted diffracted light having the phase shifted by $\pi/2$ from the reference light is emitted toward the lens 38. The direct-current component to be applied transmits the optical recording medium 36 without being diffracted. As a result, the direct-current component having the phase shifted by $\pi/2$ from the reference light is emitted toward the lens 38.

The diffracted light and the direct-current component to be applied, which are emitted from the optical recording medium 36, are inverse Fourier transformed by the lens 38 so as to be relayed, are condensed by the lens 80, and are irradiated to the direct-current component modulating element 82. The direct-current component modulating element 82 modulates only the polarized light of the zero-order diffracted component (performs polarization modulation only on the direct-current component), and transmits the first-order or higher diffraction component (the high-order component of the diffracted light) without polarization modulation. The direct-current component with the polarized light modulated by the direct-current modulating element 82, and the high-order component of the diffracted light transmitted the direct-current component modulating element 82 are converted into the collimated lights by the lens 84, and come to the polarization beam splitter 40.

The S polarized light components of the diffracted light and the direct-current component to be applied are reflected by the polarized light beam splitter 40, and come to the sensor array 42. A first reproduced image generated by the S polarized light component is formed on the light receiving surface of the sensor array 42. The P polarized light components of the diffracted light and the direct-current component to be applied transmit the polarization beam splitter 40, and come to the sensor array 44. A second reproduced image generated by the P polarized light component is formed on the light receiving surface of the sensor array 44.

Figure 9C:
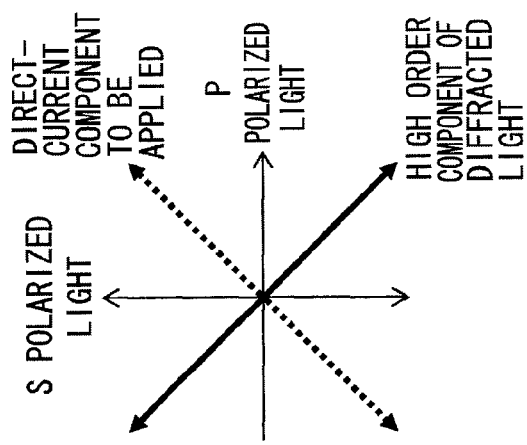
FIGS. 9A to 9C are views explaining a polarized state of a reference light and a direct-current component to be applied.

The polarized state of the reference light and the direct-current component to be applied in this case will be explained. As shown in FIG. 9A, the reference light and the direct-current component generated by the spatial light modulator 22 are "linearly polarized light 1" having constant oscillating directions of the electric field and the magnetic field, in "space A" existing between the spatial light modulator 22 and the lens 24. The oscillating direction of the "linearly polarized light 1" is inclined at 45 degrees with respect to the perpendicular direction to the paper surface of FIG. 1, according to the angle of rotation about the optic axis of the spatial light modulator 22. In other words, "linearly polarized light 1" has the polarization plane which is inclined at 45 degrees with respect to both of the polarization planes of the P polarized light and the S polarized light. Further, in "space B" existing between the lens 28 and the lens 32, the reference light and the direct-current component are "linearly polarized light 1".

Figure 9B:
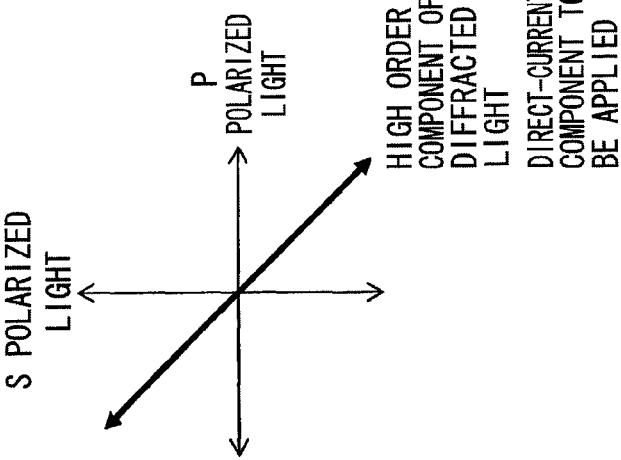
Figure 9A:
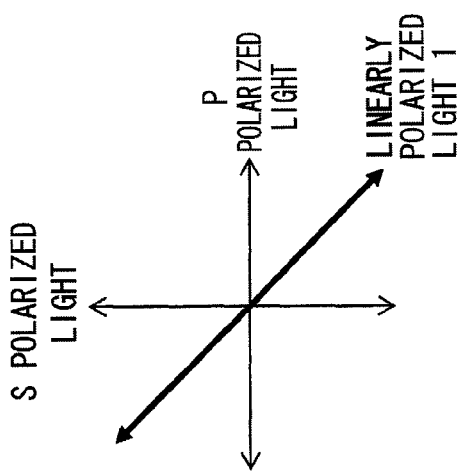

As shown in FIG. 9B, the diffracted light and the direct-current component to be applied irradiated from the optical recording medium 36 are the linearly polarized light having the same polarizing direction as "linearly polarized light 1" in "space E" existing in a downstream side of the optical recording medium 36. On the contrary, the polarization plane of the direct-current component to be applied is rotated by 90 degrees by the direct-current component modulating element 82, as shown in FIG. 9C, in "space F" existing in the downstream side of the direct-current component modulating element 82, and the direct-current component to be applied is converted into a linearly polarized light having the same polarizing direction as "linearly polarized light 2" having the polarizing direction orthogonal to "linearly polarized light 1".

The high-order component of the diffracted light passes through without polarization modulation by the direct-current component modulating element 82, and remains as the linearly polarized light having the same polarizing direction as "linearly polarized light 1". In other words, in "space F", the high-order component of the diffracted light and the direct-current component to be applied are the linearly polarized lights having the polarizing directions orthogonal to each other. The linearly polarized light may be separated into the S polarized light component which is perpendicular to the paper surface of FIG. 8, and the P polarized light component which is parallel to the paper surface of FIG. 8. The high-order component of the diffracted light and the direct-current component to be applied come to the polarization beam splitter 40, and are separated into the S polarized light component and the P polarized light component.

As mentioned above, a high-order component modulating element modulating only a high-order component of the reproduced image may be arranged instead of the direct-current component modulating element (the direct-current component modulating element 82 in FIG. 8) modulating the polarized light of only the direct-current component of the reproduced image (the diffracted light and the direct-current component to be applied). In this case, the high-order component of the diffracted light and the direct-current component to be applied are the linearly polarized lights having the polarizing directions orthogonal to each other. Accordingly, the high-order component of the diffracted light and the direct-current component to be applied come to the polarization beam splitter 40, and are separated into the S polarized light component and the P polarized light component.

Third Exemplary Embodiment

In a third exemplary embodiment, a case of recording a hologram with a direct-current component removed at a time of recording, and reproducing the hologram by applying the direct-current component at a time of reproducing. In more detail, at a time of recording, direct-current components of a signal light and a reference light are removed and then a hologram is recorded due to interference of the signal light with the reference light, from both of which the direct-current components are removed.

At a time of reproducing, the hologram is irradiated with the reference light for reading and then the direct-current component is applied to a diffracted light diffracted by the hologram. The diffracted light to which the direct-current component is applied is separated into two polarized light components which are orthogonal to each other. After a background component caused by the direct-current component is removed from each of the two polarized light components or reduced, a brightness image (a positive image) of the original signal light is reproduced from one polarized light component and a reverse image (a negative image) of the original signal light is reproduced from the other polarized light component. Though a reverse image may not necessarily be obtained due to a white rate described later, the two reproduced images will herein be called a "positive image" and a "negative image". The background component used herein means an offset resulting from a direct-current component.

By removing or reducing the background component depending on the white rate v (the rate of bright pixels in a whole bright image) of the original signal light or the diffraction efficiency of the hologram from each of the two polarized components, the dynamic range of a sensor array that detects a positive image and a negative image is not wasted and each of the positive image and negative image is reproduced precisely. Moreover, noise caused by a reproduction optical system may be removed by computing a difference of these two reproduced images. Even if a reverse image is not necessarily obtained due to the white rate, noise caused by the reproduction optical system may be removed by computing a difference of the two reproduced images.

An optical reproducing method according to the invention may be executed regardless of whether the diffracted light is a linearly polarized light or a circularly polarized light. However, in the third exemplary embodiment, a case that the hologram is recorded and reproduced by using a signal light of a linearly polarized light and a reference light of the linearly polarized light will be described.

(Schematic Structure of Optical Recording and Reproducing Apparatus)

Figure 10:
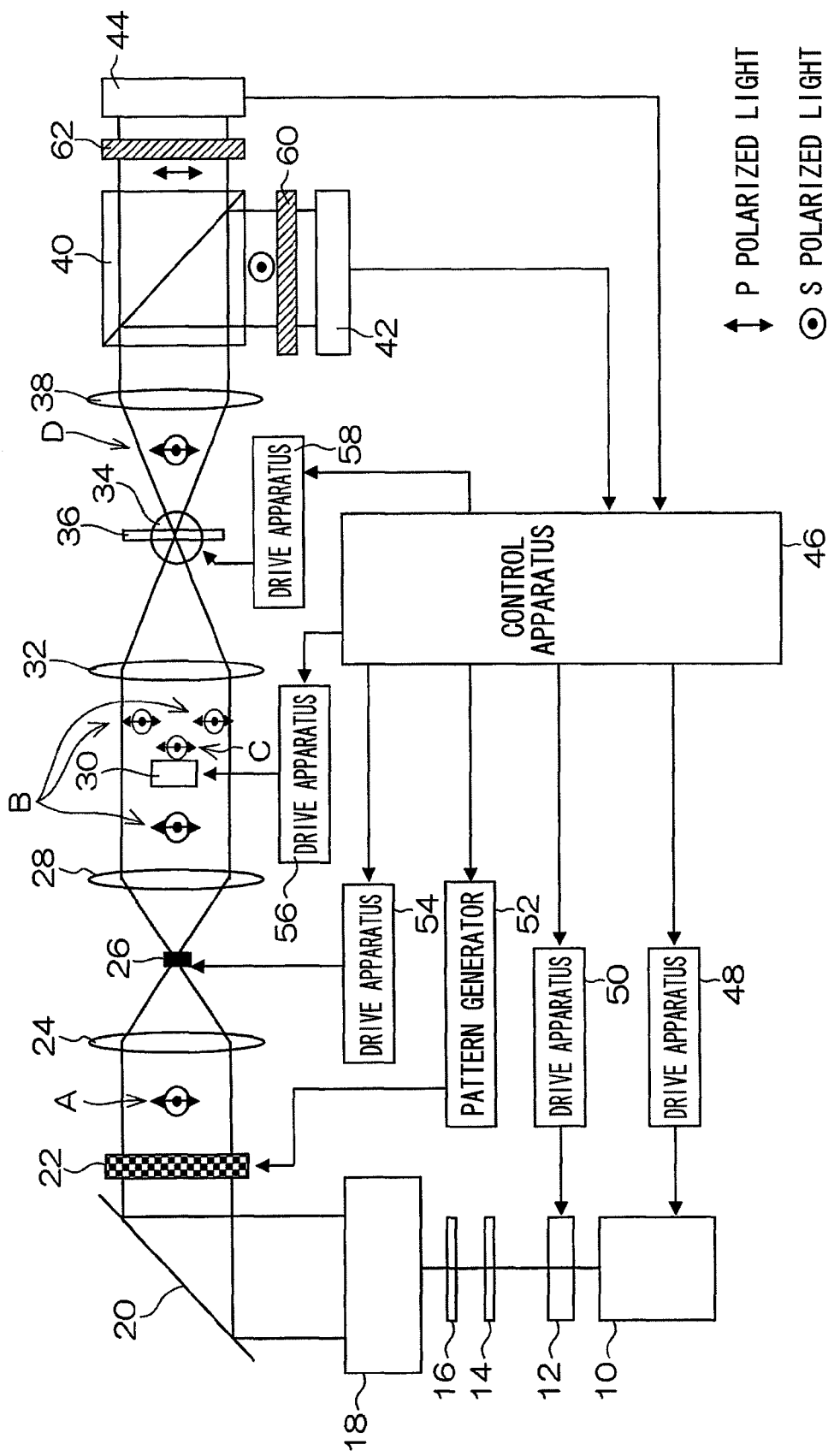
FIG. 10 is a schematic view showing a structure of an optical recording and reproducing apparatus according to exemplary embodiments of the present invention.

FIG. 10 is a schematic view showing a structure of an optical recording and reproducing apparatus according to an exemplary embodiment of the present invention. Similar elements as the elements in the first and second exemplary embodiments are attached similar numerals as the numerals attached to the similar elements in the first and second exemplary embodiments and their specific description are omitted.

The direct-current component removing element 26 is arranged in the Fourier transform plane of the lens 24, that is, in the focal plane existing between the lens 24 and the lens 28. The direct-current component removing element 26 is inserted into the optical path at a time recording to remove a direct-current component (a zero-order diffracted light component). The direct-current component removing element 26 is connected to the control apparatus 46 via the drive apparatus 54. The direct-current component removing element 26 is driven by the drive apparatus 54 to be moved according to the control signal input from the control apparatus 46 to the drive apparatus 54.

A first optical absorption element 60 is arranged between the polarization beam splitter 40 and the sensor array 42 as a removal/reduction components for removing or reducing a background component. The first optical absorption element 60 removes or reduces the background component caused by the applied direct-current component from a reflected light (an S polarized light component) of the polarization beam splitter 40. A second optical absorption element 62 is arranged, on the other hand, between the polarization beam splitter 40 and the sensor array 44 as a removal/reduction components for removing or reducing the background component. The second optical absorption element 62 removes or reduces the background component caused by the applied direct-current component from a transmitted light (a P polarized light component) of the polarization beam splitter 40.

The first optical absorption element 60 and the second optical absorption element 62 may be formed by an optical attenuator such as an ND filter which attenuates intensity of an incident light by optical absorption. The optical transmittance of the first optical absorption element 60 and the second optical absorption element 62 may each be determined depending on the value of white rate ν of the original signal light and diffraction efficiency of the hologram. A setting method of the optical transmittance will be described later. In the exemplary embodiment, an example in which an optical attenuator such as an ND filter (an optical absorption element) which attenuates intensity of an incident light by optical absorption is used as a removal/reduction components for removing or reducing the background component is described, but an optical attenuator such as a polarizing plate or polarizer which attenuates intensity of an incident light by selectively transmitting light in a predetermined polarizing direction may also be used.

Figure 15:
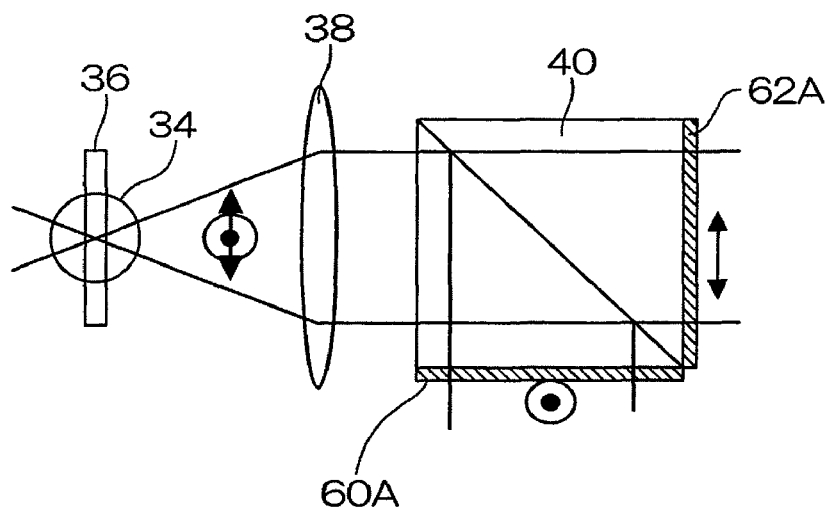
FIG. 15 is a partial schematic view showing a modification in which a removal/reduction component of the background component is an optical absorption film.

As shown in FIG. 10, the first optical absorption element 60 and the second optical absorption element 62 need not be independent optical elements. As shown in FIG. 15, an optical absorption film 60A may be formed on a reflected light emission plane of the polarization beam splitter 40 and also an optical absorption film 62A may be formed on a transmitted light emission plane of the polarization beam splitter 40. The optical absorption film 60A and the optical absorption film 62A may be formed by coating the light emission planes of the polarization beam splitter 40 with an absorption material such as a dye.

The sensor arrays 42 and 44 are formed by two-dimensional imaging elements such as a CCD, a CMOS array or the like, and convert the received light into an electric signal to output the electric signal. Each of the sensor arrays 42 and 44 is connected to the control apparatus 46. At a time of reproducing, each of the sensor arrays 42 and 44 picks a reproduced image formed on the light receiving surface, converts the reproduced image into image data, and outputs the image data to the control apparatus 46.

The control apparatus 46 compares a first reproduced image picked by the sensor array 42 with a second reproduced image picked by the sensor array 44, determines a difference value of brightness per pixel, and generates a third reproduced image on the basis of the obtained difference values. The control apparatus 46 decodes the digital data superimposed on the signal light on the basis of the third reproduced image.

(Reproducing Operation of Optical Recording and Reproducing Apparatus)

The diffracted light emitted from the optical recording medium 36 and the direct-current component to be applied are inverse Fourier transformed and formed as collimated lights by the lens 38 and come to the polarization beam splitter 40. S polarized light components of the diffracted light and the direct-current component to be applied are reflected by the polarization beam splitter 40 and come to the sensor array 42 after the background component being removed or reduced by the first optical absorption element 60. A first reproduced image generated by the S polarized light components is formed on the light receiving surface of the sensor array 42. P polarized light components of the diffracted light and the direct-current component to be applied transmit the polarization beam splitter 40 and come to the sensor array 44 after the background component being removed or reduced by the second optical absorption element 62. A second reproduced image generated by the P polarized light components is formed on the light receiving surface of the sensor array 44.

If a hologram is recorded due to interference of a signal light with a reference light, from both of which the direct-current components are removed, and the hologram is irradiated with the reference light for reading, the signal light from which the direct-current component is removed is reproduced as a diffracted light. By applying a direct-current component in the same phase to the diffracted light, the original signal light is restored and a brightness image (a positive image) of the original signal light is reproduced. By applying a direct-current component in the opposite phase to the diffracted light, on the other hand, a reverse image (a negative image) of the brightness image of the original signal light is reproduced.

As is seen from FIGS. 4A and 4B, the S polarized light component ($S_H$) of the high order component of the diffracted light has the same phase as the S polarized light component ($S_{DC}$) of the direct-current component to be applied, and both the lights are combined to generate a first combined light. A positive image as a first reproduced image is reproduced from the first combined light. The P polarized light component ($P_H$) of the high order component of the diffracted light has the opposite phase to the P polarized light component ($P_{DC}$) of the direct-current component to be applied, and both the lights are combined to generate a second combined light. A negative image as a second reproduced image is reproduced from the second combined light.

Figure 11B:
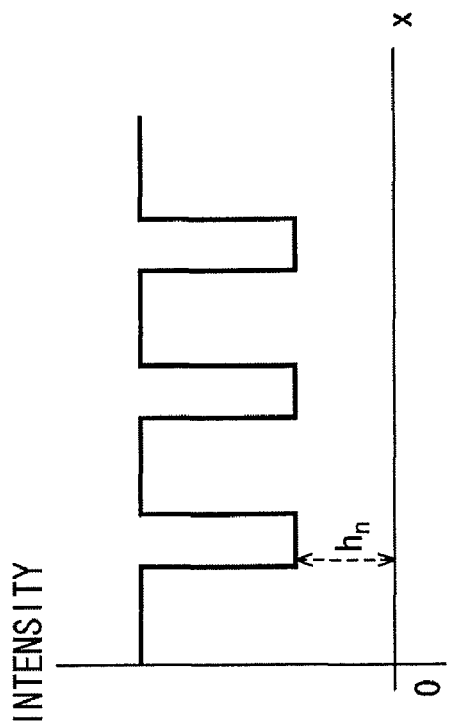
FIGS. 11A and 11B are graphs showing an intensity distribution of a first reproduced image and a second reproduced image before a background component is removed.
Figure 11A:
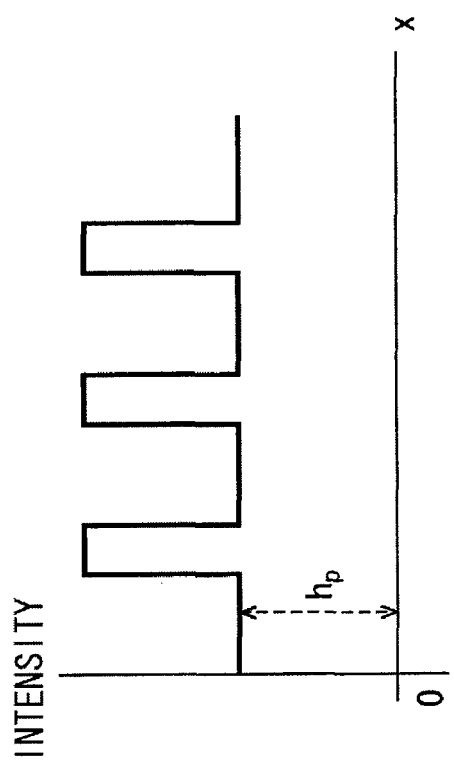
Figure 12B:
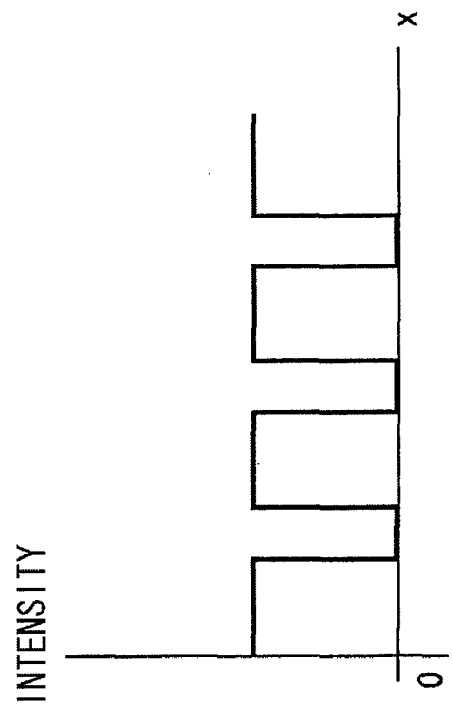
FIGS. 12A and 12B are graphs showing an intensity distribution of a first reproduced image and a second reproduced image after a background component is removed.
Figure 12A:
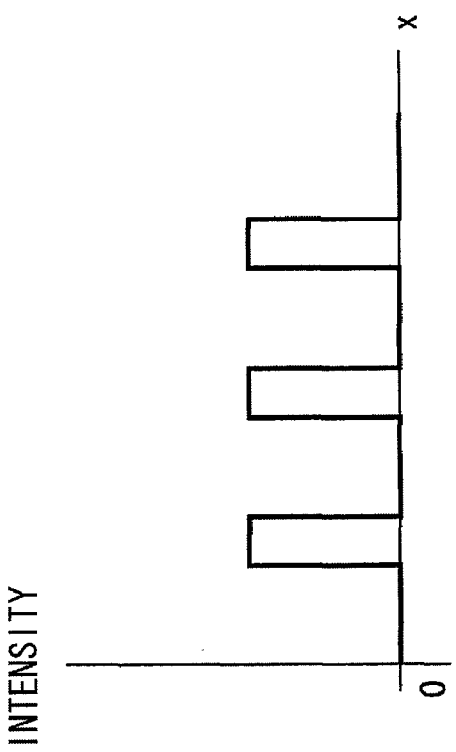

In the exemplary embodiment, the background component caused by the applied direct-current component is removed or reduced from each of the first combined light and second combined light before the first reproduced image and second reproduced image are obtained. FIGS. 11A and 11B are graphs showing an intensity distribution of the first reproduced image and second reproduced image before the background component being removed or reduced. FIGS. 12A and 12B, on the other hand, are graphs showing an intensity distribution of the first reproduced image and second reproduced image after the background component being removed. The vertical axis represents the optical intensity and the horizontal axis represents the distance along one direction of the light receiving surface. A portion with high optical intensity represents "white pixels" and a portion with low optical intensity represents "black pixels". These graphs are schematic views illustrating changes of intensity distribution before and after the background component being removed or reduced.

In the exemplary embodiment, the first reproduced image (the positive image) is reproduced from the first combined light, the S polarized light component, and the second reproduced image (the negative image) is reproduced from the second combined light, the P polarized light component. The ratio of a background component $h_p$ of the S polarized light component from which a positive image is generated to a background component $h_n$ of the P polarized light component from which a negative image is generated changes depending on the value of the white rate ν (the rate of bright pixels in a whole bright image) of the original signal light.

The background component has a positive image that is larger than a negative image and $h_n < h_p$ for $0 < \nu < 0.5$. The background component has a negative image that is equal to a positive image and $h_n = h_p$ for $\nu = 0.5$. The background component has a negative image that is larger than a positive image and $h_p < h_n$ for $0.5 < \nu < 1$. With an increasing value of intensity of the background component, it is necessary to bring the background component closer to zero by lowering the optical transmittance of the removal component.

In the exemplary embodiment, as shown in FIG. 5, the white rate ν of the original signal light satisfies the condition $0 < \nu < 0.5$ and the background component $h_p$ of a positive image is larger than the background component $h_n$ of a negative image. Therefore, the optical transmittance of the first optical absorption element 60 is set to be lower than that of the second optical absorption element 62. More specifically, the optical transmittance of the first optical absorption element 60 is set in such a way that intensity of the first reproduced image is attenuated by the background component $h_p$. Also, the optical transmittance of the second optical absorption element 62 is set in such a way that intensity of the second reproduced image is attenuated by the background component $h_n$.

By setting the optical transmittances of the first optical absorption element 60 and the second optical absorption element 62, as described above, depending on the first reproduced image and second reproduced image respectively, as shown in FIG. 12A, the background component $h_p$ is removed by the first optical absorption element 60 to set intensity of black pixels of a positive image to substantially zero and, as shown in FIG. 12B, the background component $h_n$ is removed by the second optical absorption element 62 to set intensity of black pixels of a negative image to substantially zero. By obtaining a reproduced image from a combined light from which the background component is removed, each of a positive image and a negative image is reproduced precisely by making effective use of the dynamic range of sensor arrays. Accordingly, exposure energy at a time of reproducing a hologram may be increased, contributing to an increase in multiplicity.

At a time of reproducing, each of the sensor arrays 42 and 44 converts a reproduced image formed on the light receiving surface into image data and outputs the image data to the control apparatus 46. In the sensor arrays 42 and 44, it is preferable to perform over-sampling in which one pixel of signal light data is received by a plurality of light receiving elements. For example, 1-bit data is received by four (2×2) light receiving elements.

The control apparatus 46 computes a difference of brightness with regard to each of the pixels of the brightness image representing the signal light by subtracting the image data of the second reproduced image from that of the first reproduced image. The difference when brightness of the second reproduced image (the negative image) is subtracted from that of the first reproduced image (the positive image) is positive in a bright portion of the original brightness image and negative in a dark portion of the original brightness image. Since the second reproduced image is a reverse image of the first reproduced image, an image after the subtraction processing (third reproduced image) will have a higher contrast than the first reproduced image and second reproduced image.

Since noise common to both the first reproduced image and second reproduced image is canceled out in the third reproduced image, the third reproduced image has higher SNR than each of the first reproduced image and second reproduced image. Moreover, since a background component specific to the first reproduced image and that specific to the second reproduced image are removed, no noise is caused by the background component after the cancellation and the SNR of the third reproduced image becomes still higher. In the control apparatus 46, digital data superimposed on the signal light is decoded on the basis of the third reproduced image. That is, the SNR of the third reproduced image has been improved and thus, the binary digital data is precisely decoded.

Fourth Exemplary Embodiment

In a fourth exemplary embodiment, a background component caused by a direct-current component is removed or reduced before a diffracted light to which the direct-current component is applied being separated into two polarized light components which are orthogonal to each other. Other than that, the hologram is recorded and reproduced in the same manner as in the third exemplary embodiment.

That is, at a time of recording, direct-current components of a signal light and a reference light are removed and the hologram is recorded due to the interference between the signal light and reference light with the direct-current components removed. At a time of reproducing, the hologram is irradiated with the reference light for reading and the direct-current component is applied to the diffracted light diffracted by the hologram. A background component caused by the direct-current component is removed or reduced from the diffracted light (the combined light) to which the direct-current component is applied. The combined light from which the background component is removed or reduced is separated into two polarized light components which are orthogonal to each other, and a brightness image (a positive image) of the original signal light is reproduced from one polarized light component and a reverse image (a negative image) of the original signal light is reproduced from the other polarized light component.

(Schematic Structure of Optical Recording and Reproducing Apparatus)

Figure 13:
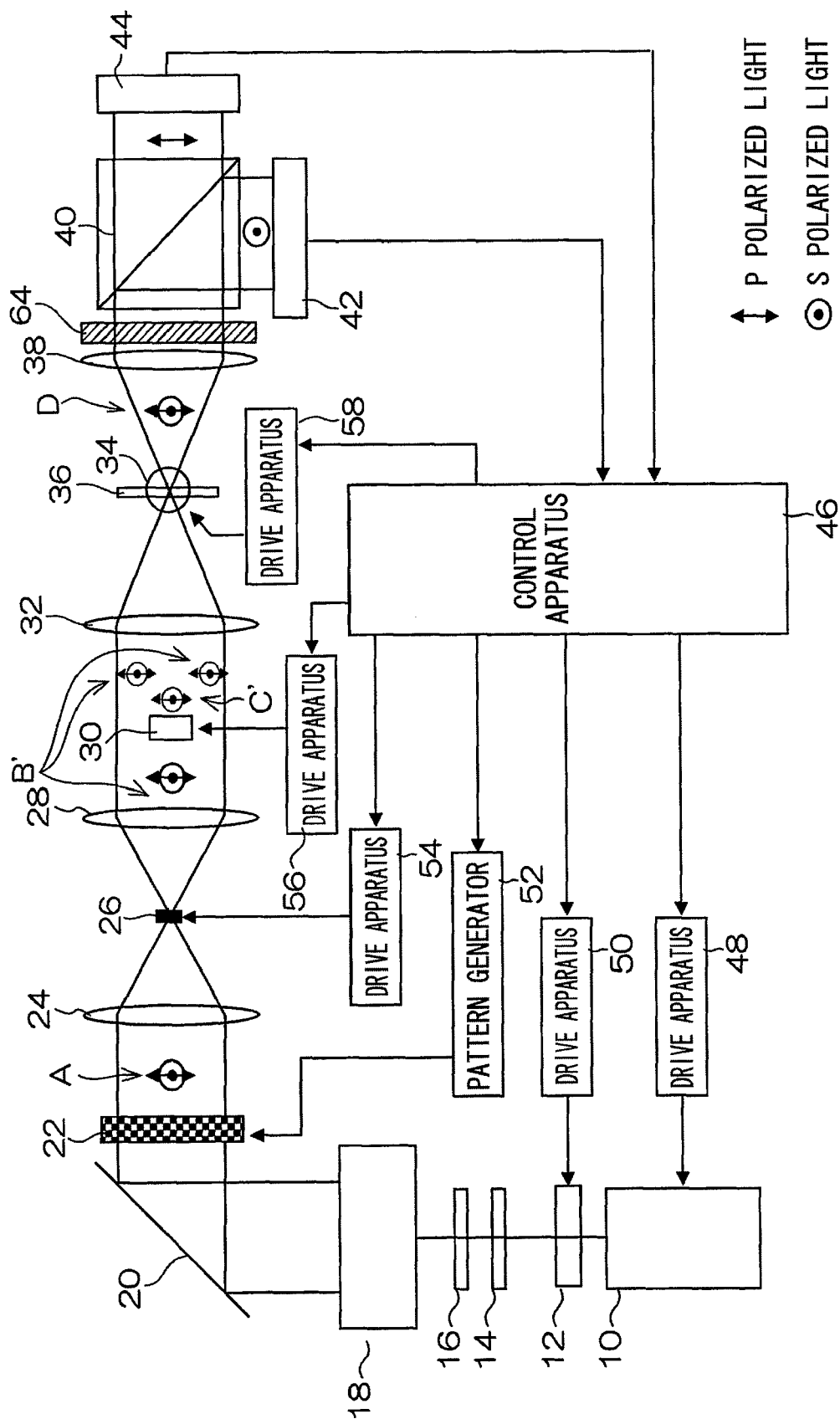
FIG. 13 is a schematic view showing a structure of an optical recording and reproducing apparatus according to a fourth exemplary embodiment of the present invention.

FIG. 13 is a schematic view showing a structure of an optical recording and reproducing apparatus according to a fourth exemplary embodiment of the present invention.

The optical recording and reproducing apparatus has the same structure as the optical recording and reproducing apparatus according to the third exemplary embodiment shown in FIG. 10 except that the first optical absorption element 60 and the second optical absorption element 62 are removed and instead an optical absorption element 64 is inserted between the lens 38 and the polarization beam splitter 40 and thus, the same reference numerals are attached to the same components and a description thereof will not be repeated. Incidentally, the optical absorption element 64 may be inserted between the holding stage 34 and the lens 38. Also at this position, the background component caused by the direct-current component may similarly be removed or reduced before the diffracted light being separated into two polarized light components.

The optical absorption element 64 may be formed by an optical attenuator such as an ND filter which attenuates intensity of an incident light by optical absorption. The optical transmittance of the optical absorption element 64 may be determined depending on the value of white rate ν of the original signal light. A setting method of the optical transmittance will be described later. Instead of the ND filter (the optical absorption element), an optical attenuator such as a polarizing plate or polarizer which attenuates intensity of an incident light by selectively transmitting light in a predetermined polarizing direction may also be used.

Figure 16A:
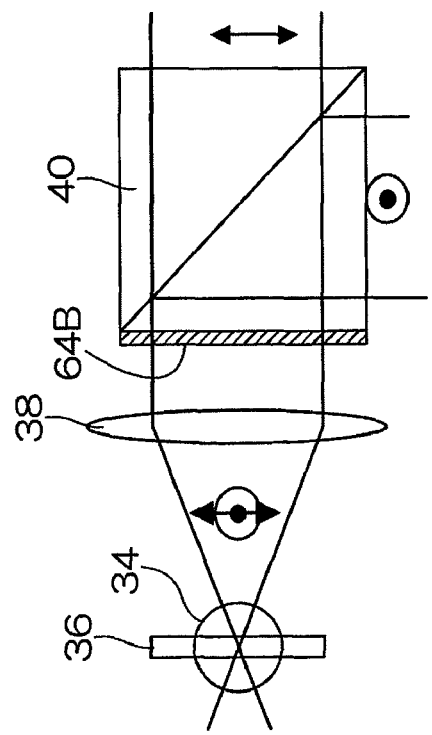
FIGS. 16A and 16B are partial schematic views showing modifications in which the removal/reduction component of the background component is an optical absorption film.
Figure 16B:
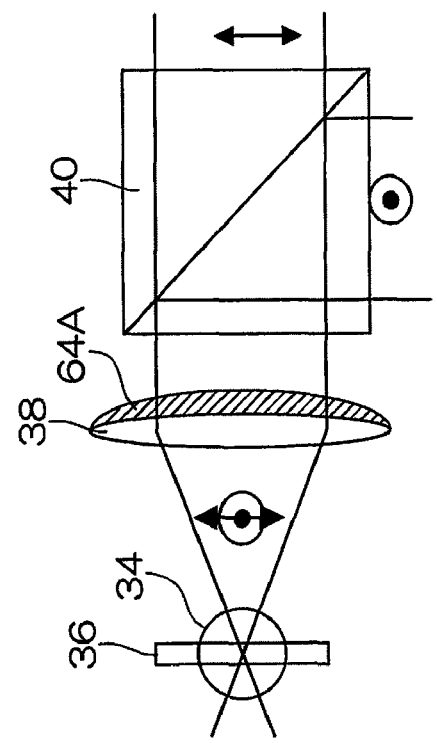

As shown in FIG. 13, the optical absorption element 64 need not be an independent optical element. As shown in FIG. 16A, an optical absorption film 64A may be formed on a light emission plane of the lens 38. Or, as shown in FIG. 16B, an optical absorption film 64B may be formed on a light incidence plane of the polarization beam splitter 40. The optical absorption film 64A and the optical absorption film 64B may be formed by coating surfaces of each optical component with an absorption material such as a dye.

(Reproducing Operation of Optical Recording and Reproducing Apparatus)

Next, a reproducing operation of the optical recording and reproducing apparatus shown in FIG. 13 will be explained.

When data recorded in the optical recording medium 36 is read (at a time of reproducing), like the first exemplary embodiment, a laser light is modulated depending on the pattern for reproducing displayed on the spatial light modulator 22, and a reference light for reading and a direct-current component having a phase difference of $\pi/2$ with the reference light are generated.

The reference light and the direct-current component generated by the spatial light modulator 22 are relayed by the lenses 24 and 28 and are formed as parallel lights by the lens 28. The direct-current component formed as the collimated light by the lens 28 passes through the signal light optical path and comes to the lens 32 after the polarization plane thereof being rotated by 90 degrees by the direct-current component modulating element 30 arranged on the signal light optical path. When the polarization plane is rotated by 90 degrees, the phase difference of the S polarized light component with respect to the P polarized light component becomes π. The reference light formed as the collimated light by the lens 28 passes through the reference light optical path to come to the lens 32. The reference light and the direct-current component input to the lens 32 are Fourier transformed and condensed by the lens 32 before a region in which the hologram of the optical recording medium 36 is recorded being irradiated therewith.

In other words, the optical recording medium 36 is irradiated with the reference light as the reading light and also the direct-current component having the phase shifted by $\pi/2$ from the reference light and having the polarizing direction orthogonal to the reference light. The irradiated reference light is diffracted by the hologram at a time of transmitting the optical recording medium 36 and the transmitted diffracted light having the phase shifted by $\pi/2$ from the reference light is emitted toward the lens 38. The direct-current component to be applied transmits the optical recording medium 36 without being diffracted. As a result, the direct-current component having the phase shifted by $\pi/2$ from the reference light is emitted toward the lens 38. In this case, the high order component of the diffracted light and the direct-current component to be applied become linearly polarized lights having polarizing directions orthogonal to each other. The linearly polarized light may be separated into an S polarized light component and a P polarized light component.

The diffracted light and the direct-current component to be applied emitted from the optical recording medium 36 are inverse Fourier transformed and formed as collimated lights by the lens 38 and pass through the optical absorption element 64 so that background components are removed or reduced. A combined light of the diffracted light and direct-current component from which background components are removed comes to the polarization beam splitter 40. S polarized light components of the diffracted light and the direct-current component to be applied are reflected by the polarization beam splitter 40 and come to the sensor array 42. A first reproduced image by the S polarized light components is formed on the light receiving surface of the sensor array 42. P polarized light components of the diffracted light and the direct-current component to be applied transmit the polarization beam splitter 40 and come to the sensor array 44. A second reproduced image by the P polarized light components is formed on the light receiving surface of the sensor array 44.

In the present exemplary embodiment, like the third exemplary embodiment, the S polarized light component of the high order component of the diffracted light has the same phase as that of the direct-current component to be applied. Therefore, the S polarized light component of the high order component of the diffracted light and that of the direct-current component in the same phase are combined to reproduce a positive image as a first reproduced image. The P polarized light component of the high order component of the diffracted light has the opposite phase to that of the direct-current component to be applied. Therefore, the polarized light component of the high order component of the diffracted light and that of the direct-current component in the opposite phase thereto are combined to reproduce a negative image as a second reproduced image.

Figure 14A:
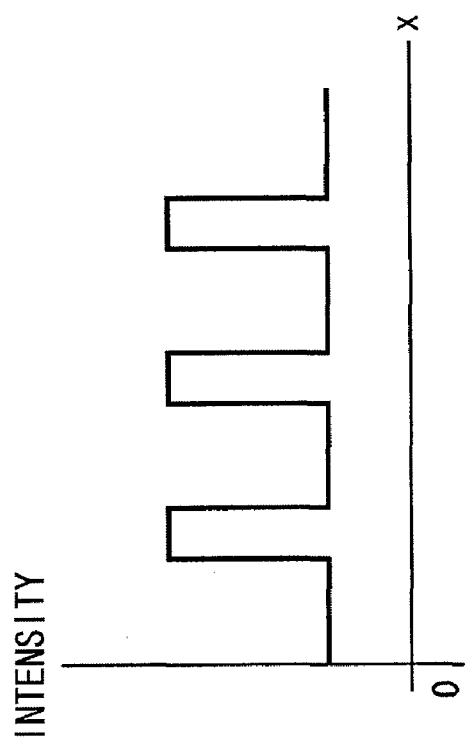
FIGS. 14A and 14B are graphs showing the intensity distribution of the first reproduced image and the second reproduced image after the background component is removed or reduced.
Figure 14B:
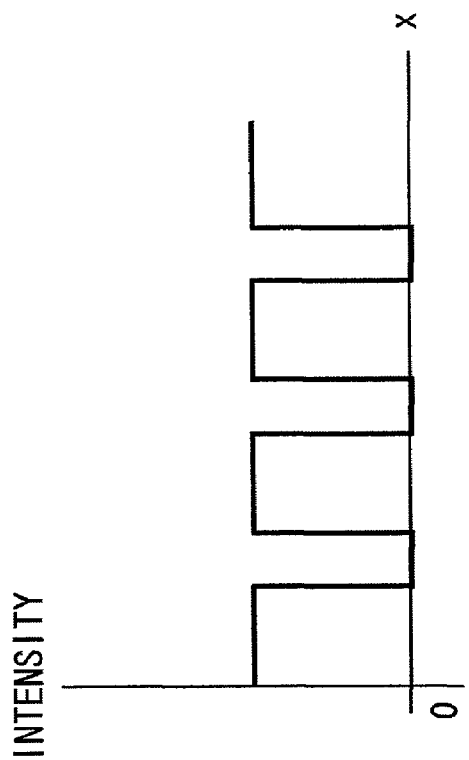

In the present exemplary embodiment, the background component caused by the applied direct-current component is removed or reduced from the diffracted light to which the direct-current component is applied at a time before the diffracted light to which the direct-current component is applied being separated into two polarized light components which are orthogonal to each other. Therefore, only one optical absorption element 64 needs to be arranged on the optical path. FIGS. 11A and 11B are graphs showing an intensity distribution of the first reproduced image and second reproduced image before the background component being removed. FIGS. 14A and 14B, on the other hand, are graphs showing an intensity distribution of the first reproduced image and second reproduced image after the background component being removed or reduced.

As described in the first exemplary embodiment, the ratio of the background component $h_p$ of the S polarized light component from which a positive image is generated to the background component $h_n$ of the P polarized light component from which a negative image is generated changes depending on the value of the white rate v of the original signal light. In the present exemplary embodiment, as shown in FIG. 5, the white rate v of the original signal light satisfies the condition 0<v<0.5 and the background component $h_p$ of a positive image is larger than the background component $h_n$ of a negative image.

Therefore, the optical transmittance of the optical absorption element 64 is set depending on the background component $h_n$ of a negative image. That is, the optical transmittance of the optical absorption element 64 is set depending on the smaller background component so that a necessary signal component will not be removed. More specifically, the optical transmittance of the optical absorption element 64 is set in such a way that intensity of the first reproduced image and that of the second reproduced image are each attenuated by the background component $h_n$ of a negative image. The setting method of the optical transmittance of the optical absorption element 64 is the same even if the value of the white rate v of the original signal light changes. If 0.5<v<1, for example, the background component $h_p$ of a positive image is smaller than the background component $h_n$ of a negative image. In this case, the optical transmittance of the optical absorption element 64 is set depending on the background component $h_p$ of a positive image.

By setting the optical transmittance of the optical absorption element 64, as described above, depending on the background component $h_n$ of a negative image, the common background component is removed or reduced. That is, as shown in FIG. 14A, intensity of black pixels of a positive image is lowered after the background component $h_n$ being removed by the optical absorption element 64 and, as shown in FIG. 14B, intensity of black pixels of a negative image is set to substantially zero after the background component $h_n$ being removed by the optical absorption element 64. By obtaining a reproduced image from a combined light from which the background component is reduced, each of a positive image and a negative image is reproduced precisely by making effective use of the dynamic range of sensor arrays. Accordingly, exposure energy at a time of reproducing a hologram may be increased, contributing to an increase in multiplicity.

At a time of reproducing, each of the sensor arrays 42 and 44 converts a reproduced image formed on the light receiving surface into image data and outputs the image data to the control apparatus 46. In the sensor arrays 42 and 44, it is preferable to perform over-sampling in which one pixel of signal light data is received by a plurality of light receiving elements. For example, 1-bit data is received by four (2×2) light receiving elements.

The control apparatus 46 computes a difference of brightness with regard to each of the pixels of the brightness image representing the signal light by subtracting the image data of the second reproduced image from that of the first reproduced image. The difference when brightness of the second reproduced image (the negative image) is subtracted from that of the first reproduced image (the positive image) is positive in a bright portion of the original brightness image and negative in a dark portion of the original brightness image. Since the second reproduced image is a reverse image of the first reproduced image, an image after the subtraction processing (the third reproduced image) will have a higher contrast than the first reproduced image and second reproduced image.

Since noise common to both the first reproduced image and second reproduced image is canceled out in the third reproduced image, the third reproduced image has higher SNR than each of the first reproduced image and second reproduced image. In the control apparatus 46, digital data superimposed on the signal light is decoded on the basis of the third reproduced image. That is, the SNR of the third reproduced image has been improved and thus, the binary digital data is precisely decoded.

Modification

In the first and second exemplary embodiments, an example in which, at a time of reproducing, a diffracted light to which a direct-current component is applied is separated into two polarized light components which are orthogonal to each other, and a positive image of the original signal light is reproduced from one polarized light component and also a negative image of the original signal light is reproduced from the other polarized light component, but the invention may also be applied to a reproducing method of sequentially reproducing a positive image and a negative image.

For example, when a positive image is reproduced from a first combined light in which a direct-current component in the same phase is applied to a diffracted light and a negative image is reproduced from a second combined light in which the direct-current component in the opposite phase is applied to the diffracted light, after a positive image is detected by a sensor array by arranging one optical absorption element and one sensor array on an optical detection side to remove a background component from the first combined light by the optical absorption element, a negative image may be detected by the same sensor array by removing a background component from the second combined light by the same optical absorption element.

In the third and fourth exemplary embodiments, a case in which a hologram is recorded and reproduced using a signal light of a linearly polarized light and a reference light of the linearly polarized light is described, but a hologram may be recorded and reproduced using a signal light and a reference light of a circularly polarized light. In this case, for example, a plurality of relay lenses and a quarter-wave plate are applied between the spatial light modulator 22 and the lens 24 in the optical recording and reproducing apparatus shown in FIG. 1 to convert a linearly polarized light into a circularly polarized light.

With the quarter-wave plate applied, at a time of recording, a recording light of a linearly polarized light generated by the spatial light modulator 22 is relayed by the plurality of lenses and converted into a circularly polarized light by the quarter-wave plate. When being converted into a circularly polarized light by the quarter-wave plate, an optical path difference of ¼ wavelength (a phase difference of π/2) is applied between an S polarized light component and a P polarized light component of the recording light. The recording light converted into a circularly polarized light by the quarter-wave plate is condensed by the lens 24 and the direct-current component removing element 26 is irradiated with the recording light. Unnecessary frequency components of the recording light condensed by the lens 24 are cut by the direct-current component removing element 26 and the remainder passes through the direct-current component removing element 26. That is, the zero-order diffracted light component is blocked (the direct-current component is removed) by the direct-current component removing element 26 and first-order and higher order diffracted light components are transmitted. The recording light after passing through the direct-current component removing element 26 is formed as a parallel light by the lens 28.

The recording light converted into the parallel light by the lens 28, that is, the signal light and the reference light from both of which the direct-current components are removed are Fourier transformed and condensed by the lens 32 while remaining a circularly polarized light before the optical recording medium 36 being irradiated with the recording light simultaneously and coaxially. Interference fringes formed by interference between the signal light and the reference light at a position where the signal light and the reference light are condensed are recorded as a hologram in the optical recording medium 36.

At a time of reproducing, on the other hand, a laser light is modulated depending on the pattern for reproducing displayed in the spatial light modulator 22, and a reference light and a direct-current component to be applied are generated. A direct-current component having a phase difference of $\pi/2$ with the reference light is generated as the direct-current component to be applied. A signal light generated by the spatial light modulator 22 and the direct-current component are linearly polarized lights having the polarization plane rotated by a predetermined angle (for example, 45 degrees) around the optic axis with respect to the incidence plane. The reference light and direct-current component of the linearly polarized light generated by the spatial light modulator 22 are relayed by the plurality of lenses and converted into a circularly polarized light by the quarter-wave plate. When being converted into a circularly polarized light by the quarter-wave plate, an optical path difference of ¼ wavelength (a phase difference of $\pi/2$) is applied between the S polarized light component and the P polarized light component of the reference light and the direct-current component. The recording light converted into a circularly polarized light by the quarter-wave plate is relayed by the lenses 24 and 28 and is formed as parallel lights by the lens 28.

The direct-current component formed as the collimated light by the lens 28 passes through the signal light optical path and comes to the lens 32 after being converted into a reversed circularly polarized light by the direct-current component modulating element 30 arranged on the signal light optical path. The reference light formed as the collimated light by the lens 28 passes through the reference light optical path to come to the lens 32. The reference light and the direct-current component input to the lens 32 are Fourier transformed and condensed by the lens 32 while remaining circularly polarized lights before a region in which the hologram of the optical recording medium 36 is recorded being irradiated therewith.

In other words, the optical recording medium 36 is irradiated with the reference light as the reading light and also the direct-current component having the phase shifted by $\pi/2$ from the reference light and having the polarizing direction orthogonal to the reference light (with the reversed rotation direction). The irradiated reference light is diffracted by the hologram at a time of transmitting the optical recording medium 36 and the transmitted diffracted light having the phase shifted by $\pi/2$ from the reference light is emitted toward the lens 38. The direct-current component to be applied transmits the optical recording medium 36 without being diffracted. As a result, the direct-current component having the phase shifted by $\pi/2$ from the reference light is emitted toward the lens 38. That is, the high order component of the diffracted light and the direct-current component to be applied become circularly polarized lights having rotation directions opposite to each other.

Like the linearly polarized light, the circularly polarized light may be separated into an S polarized light component and a P polarized light component. The diffracted light and the direct-current component to be applied emitted from the optical recording medium 36 are inverse Fourier transformed and formed as collimated lights by the lens 38 and come to the polarization beam splitter 40 while remaining circularly polarized lights. S polarized light components of the diffracted light and the direct-current component to be applied are reflected by the polarization beam splitter 40 and come to the sensor array 42 after background components being removed or reduced by the first optical absorption element 60. A first reproduced image by the S polarized light components is formed on the light receiving surface of the sensor array 42. P polarized light components of the diffracted light and the direct-current component to be applied transmit the polarization beam splitter 40 and come to the sensor array 44 after background components being removed or reduced by the second optical absorption element 62. A second reproduced image by the P polarized light components is formed on the light receiving surface of the sensor array 44.

In the third and fourth exemplary embodiments, an optical recording and reproducing apparatus of "coaxial transmission type" using an optical recording medium of transmission type and a method, but the invention may also be applied to an optical recording and reproducing apparatus of "coaxial reflection type" using an optical recording medium of reflection type having a recording layer including an optical recording material and a reflection layer and a method.

In the third and fourth exemplary embodiments, a case in which a hologram is recorded by removing a direct-current component at a time of recording and the hologram is reproduced by applying the direct-current component at a time of reproducing, but a hologram may be recorded without removing a direct-current component at a time of recording so that the hologram may be reproduced by applying the direct-current component only at a time of reproducing. Also in this case, when the hologram is irradiated with the reference light for reading, the signal light is reproduced as a diffracted light. By applying the direct-current component in the same phase to the diffracted light, a brightness image (a positive image) of the original signal light is reproduced. By applying the direct-current component in the opposite phase to the diffracted light, on the other hand, a reverse image (a negative image) of the brightness image of the original signal light is reproduced.

In the third and fourth exemplary embodiments, an example in which polarized light of the direct-current component to be applied is modulated (the polarization plane is rotated) at a time of reproducing is described. However, instead of the direct-current component to be applied, polarized light of the reference light for reading may be modulated. For example, in the optical recording and reproducing apparatus shown in FIG. 10, a wavelength plate (a high order component modulating element) that rotates the polarized light of only the reference light by 90 degrees is arranged, instead of the direct-current component modulating element 30. Only the light that passes through the reference light optical path is modulated by the high order component modulating element. Accordingly, a negative image and a positive image may be acquired simultaneously as reproduced images by modulating the polarized light of the reference light for reading. The formation principle of reproduced images is as described with reference to FIG. 4A and FIG. 4B.

A list of the polarization components of the present invention are shown in the following Table 1.

TABLE 1

|  | polarization component having first polarization plane (for example, P polarization component on the basis of PBS) | polarization component having second polarization plane (for example, P polarization component on the basis of PBS) |
|---|---|---|
| diffracted light | first polarization component | second polarization component |
| direct-current component | third polarization component | fourth polarization component |
| combined light | fifth polarization component = first polarization component + third polarization component | sixth polarization component = second polarization component + fourth polarization component |

PBS: polarization beam splitter

What is claimed is:

1. An optical reproducing apparatus comprising:
a light source that irradiates a coherent light;
a spatial light modulator that includes a plurality of pixel portions arranged in a two-dimensional shape, includes a signal light region generating a signal light or a direct-current component to be applied and a reference light region arranged so as to surround the signal light region and generating a reference light coaxial with the signal light, displays a transmission pattern having a constant brightness in the signal light region of the spatial light modulator and displays a reference light pattern in the reference light region of the spatial light modulator, modulates the light incoming from the light source per pixel according to a display pattern and generates the reference light and the direct-current component to be applied;
a combined light optical system that condenses the reference light and the direct-current component to be applied generated by the spatial light modulator to a recording region of an optical recording medium, generates a diffracted light, which is a polarized light including a first polarization component with a first polarization plane and a second polarization component with a second polarization plane that is orthogonal to the first polarization plane, from a hologram recorded in the recording region, generates a direct-current component formed by a polarized light having a third polarization component with the first polarization plane having a polarizing direction orthogonal to the diffracted light and having the same phase as the phase of the diffracted light and a fourth polarization component with the second polarization plane having an opposite phase to the phase of the diffracted light, combines the direct-current component formed by the polarized light with the diffracted light and generates a combined light;
a polarization beam splitter that separates the combined light generated by the combined light optical system into a fifth polarization component, which includes the first polarization component and the third polarization component, and a sixth polarization component, which includes the second polarization component and the fourth polarization component;
a first light detector that detects a first reproduced image from the separated fifth polarization component; and
a second light detector that detects a second reproduced image from the separated sixth polarization light component.

2. The optical reproducing apparatus of claim 1, further comprising a control apparatus that obtains a difference value of a brightness per pixel by comparing the first reproduced image with the second reproduced image, obtains a third reproduced image based on whether the obtained difference value is positive or negative and decodes digital data superposed on the signal light on the basis of the obtained third reproduced image.

3. The optical reproducing apparatus of claim 2, wherein the combined light optical system includes:
a collimator lens system that collimates the reference light and the direct-current component to be applied generated by the spatial light modulator;
a condensing lens that condenses the collimated reference light and the collimated direct-current component to be applied, to the recording region of the optical recording medium;
a direct-current component modulating element that, by rotating a polarization plane of the direct-current component to be applied generated from a hologram recorded in the recording region, generates a direct-current component having a polarization direction which is orthogonal to a polarization direction of the diffracted light on a focal point surface of the condensing lens; and
a collimator lens system that collimates the diffracted light generated from the hologram, and the direct-current component to be applied with the polarization plane thereof rotated by the direct-current component modulating element.

4. The optical reproducing apparatus of claim 1, wherein the combined light optical system includes:
a collimator lens system that collimates the reference light and the direct-current component to be applied generated by the spatial light modulator;
a direct-current component modulating element that, by rotating a polarization plane of the collimated direct-current component to be applied, generates a direct-current component having a polarization direction which is orthogonal to a polarization direction of the diffracted light; and
a condensing lens that condenses the collimated reference light, and the direct-current component to be applied with the polarization plane thereof rotated by the direct-current component modulating element, to the recording region of the optical recording medium.

5. The optical reproducing apparatus of claim 1, wherein the combined light optical system includes:
a collimator lens system that collimates the reference light and the direct-current component to be applied generated by the spatial light modulator;
a high-order component modulating element that, by rotating a polarization plane of the collimated reference light and rotating a polarization plane of a high order component of the diffracted light, generates a direct-current component having a polarization direction which is orthogonal to a polarization direction of the diffracted light; and a condensing lens that condenses the collimated direct-current component to be applied, and the direct-current component to be applied with the polarization plane thereof rotated by the high-order component modulating element, to the recording region of the optical recording medium.

6. The optical reproducing apparatus of claim 1, wherein the combined light optical system includes:

a collimator lens system that collimates the reference light and the direct-current component to be applied generated by the spatial light modulator;

a condensing lens that condenses the collimated reference light and the collimated direct-current component to be applied, to the recording region of the optical recording medium;

a high-order component modulating element that, by rotating a polarization plane of the diffracted light generated from the hologram recorded in the recording region and rotating a polarization plane of a high order component of the diffracted light, generates a direct-current component having a polarization direction which is orthogonal to a polarization direction of the diffracted light on a focal point surface of the condensing lens; and a collimator lens system that collimates the direct-current component to be applied generated from the hologram, and the high order component of the diffracted light with the polarization plane thereof rotated by the high-order component modulating element.

7. The optical reproducing apparatus of claim 1 further comprising a removal/reduction component that removes or reduces a background component caused by the applied direct-current component from the combined light by absorbing or selectively transmitting an incident light.

8. The optical reproducing apparatus of claim 1 further comprising a first removal/reduction component that removes or reduces a background component caused by the applied direct-current component from the fifth polarization component by absorbing or selectively transmitting an incident light; and a second removal/reduction component that removes or reduces the background component caused by the applied direct-current component from the sixth polarization component by absorbing or selectively transmitting the incident light.

* * * * *